United States Patent
Manabe et al.

(10) Patent No.: US 6,827,989 B2
(45) Date of Patent: Dec. 7, 2004

(54) LIQUID CRYSTALLINE MEDIUM

(75) Inventors: Atsutaka Manabe, Bensheim (DE); Volker Reiffenrath, Rossdorf (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/179,399

(22) Filed: Jun. 26, 2002

(65) Prior Publication Data

US 2003/0098443 A1 May 29, 2003

(30) Foreign Application Priority Data

Jun. 26, 2001 (EP) .......................................... 01 115 344

(51) Int. Cl.$^7$ .......................... C09K 19/30; C09K 19/12
(52) U.S. Cl. ............... 428/1.1; 252/299.63; 252/299.66
(58) Field of Search ....................... 252/299.63, 299.66, 252/299.01; 428/1.1

(56) References Cited

U.S. PATENT DOCUMENTS 6,740,369 B2 * 5/2004 Klasen-Memmer et al. . 428/1.1

FOREIGN PATENT DOCUMENTS

| DE | 10218975 | * 12/2002 |
| JP | 09208503 | * 8/1997 |

OTHER PUBLICATIONS

English translation for JP 09–208,503 by computer, http://www6.ipdl.jpo.go.jp/Tokujitu/PAJdetail.ipdl?N0000=80&N0120=01&N2001=2&N3001=H09–208503.*

CAPLUS 1988: 539695.*

CAPLUS 1989: 213400.*

* cited by examiner

*Primary Examiner*—Shean C Wu
(74) *Attorney, Agent, or Firm*—Millen, White, Zelano, Branigan, P.C.

(57) ABSTRACT

The invention relates to a liquid-crystalline medium with positive dielectric anisotropy and high optical anisotropy, characterized in that it contains one or more biphenyl derivatives comprising a terminal alkenyl group, and its use in electrooptical displays and projection systems, in particular reflective displays and displays based on a birefringence effect, such as OCB displays.

60 Claims, No Drawings

LIQUID CRYSTALLINE MEDIUM

The invention relates to a liquid-crystalline medium with positive dielectric anisotropy and high optical anisotropy, characterized in that it contains one or more biphenyl derivatives comprising a terminal alkenyl group, and its use in electrooptical displays and projection systems, in particular reflective displays, LCoS™ displays and displays based on a birefringence effect, such as OCB displays.

Displays of the OCB (optically compensated bend) are based on a birefringence effect and comprise a liquid crystal layer with a bend structure. The bend cell, also known as pi-cell, was first proposed by P. Bos et al., SID 83 Digest, 30 (1983) for an electrically controllable half-wave plate, whereas the OCB mode for displays was described by Y. Yamaguchi, T. Miyashita and T. Uchida, SID 93 Digest, 277 (1993), followed by papers of T. Miyashita et al. in, inter alia, Proc. Eurodisplay, 149 (1993), J.Appl.Phys. 34, L177 (1995), SID 95 Digest, 797 (1995), and C. -L. Kuo et al., SID 94 Digest, 927 (1994). An OCB cell comprises a liquid crystal cell with bend alignment and a liquid crystal medium with positive $\Delta\varepsilon$. Furthermore, OCB displays as reported in the above papers comprise one or more birefringent optical retardation films to eliminate light leakage by the bend cell in the black state. OCB displays bear several advantages like for example a wider viewing angle and shorter switching times than conventional displays based on twisted nematic (TN) cells.

The above mentioned papers have shown that liquid-crystalline phases must have high values for the optical anisotropy $\Delta n$ and a relatively high positive value for the dielectric anisotropy $\Delta\varepsilon$, and preferably should have rather low values for the ratio between the elastic constants $K_{33}/K_{11}$ and for the viscosity, in order to be usable for high-information display elements based on the OCB effect. The industrial application of the OCB effect in electro-optical display elements requires LC phases which must satisfy a multiplicity of requirements. Particularly important here are chemical resistance to moisture, air and physical effects such as heat, radiation in the infra-red, visible and ultra-violet regions and direct and alternating electrical fields. Furthermore, LC phases which can be used industrially need a liquid-crystalline mesophase in a suitable temperature range, a relatively high birefringence, a positive dielectric anisotropy and a low viscosity.

LCoS™ (Liquid Crystal on Silicon) displays are known in prior art and are available from Three-Five Systems Inc. (Tempe, Ariz., USA). LCoS™ microdisplays are reflective displays that typically comprise a liquid crystal layer with twisted nematic structure sandwiched by a silicon backplane and a cover glass. The silicon backplane is an array of pixels, each of which has a mirrored surface which is at the same time a conductor. Each pixel comprises a stationary mirror covered by an active liquid crystal layer with twisted nematic orientation that can be switched into homeotropic orientation by application of a voltage. LCoS™ microdisplays are small with a diagonal of typically less than 1.0", however, they enable high resolution from ¼ VGA (78 thousand pixels) to UXGA+ (over 2 million pixels).

Due to the small pixel size LCoS™ displays also have a very thin cell thickness, which is typically about 1 micron. Therefore, liquid-crystalline phases used in these displays must in particular have high values for the optical anisotropy $\Delta n$, in contrast to conventional reflective type LC displays, which usually require LC phases with low $\Delta n$.

None of the series of compounds having a liquid-crystalline mesophase which have been disclosed hitherto includes a single compound which meets all these requirements. Generally, therefore, mixtures of from two to 25, preferably from three to 18, compounds are prepared to give substances which can be used as LC phases. However, ideal phases cannot easily be produced in this way, since liquid-crystal materials having at the same time high birefringence and low viscosity were hitherto not available.

OCB mode and LCoS™ displays can be operated as matrix displays. Matrix liquid-crystal displays (MLC displays) are known. Examples of nonlinear elements which can be used to individually switch the individual pixels are active elements (i.e. transistors). This is then referred to as an "active matrix", and a differentiation can be made between two types:
1. MOS (metal oxide semiconductor) transistors on silicon wafers as substrate,
2. Thin-film transistors (TFT) on a glass plate as substrate.

In the case of type 1, the electro-optical effect used is usually dynamic scattering or the guest-host effect. The use of monocrystalline silicon as substrate material restricts the display size, since even the modular assembly of various part-displays results in problems at the joins.

In the case of the more promising type 2, which is preferred, the electro-optical effect used is usually the TN effect. A distinction is made between two technologies: TFTs comprising compound semi-conductors, such as, for example, CdSe, or TFTs based on polycrystalline or amorphous silicon. Intensive research efforts are being made worldwide in the latter technology.

The TFT matrix is applied to the inside of one glass plate of the display, while the inside of the other glass plate carries the transparent counterelectrode. Compared with the size of the pixel electrode, the TFT is very small and has virtually no adverse effect on the image. This technology can also be extended to fully colour-compatible image displays, in which a mosaic of red, green and blue filters is arranged in such a manner that each filter element is located opposite a switchable pixel.

The TFT displays disclosed hitherto usually operate as TN cells with crossed polarizers in transmitted light and are illuminated from the back. In case of OCB mode displays, however, reflective displays have also been proposed by T. Uchida, T. Ishinabe and M. Suzuki in SID 96 Digest, 618 (1996).

The term MLC display here covers any matrix display containing integrated nonlinear elements, i.e. in addition to the active matrix, also displays containing passive elements such as varistors or diodes (MIM=metal-insulator-metal).

MLC displays of this type are particularly suitable for TV applications (for example pocket TV sets) or for high-information displays in automobile or aircraft construction. In addition to problems with respect to the angle dependence of the contrast and the response times, difficulties occur in MLC displays due to inadequate resistivity of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. As the resistance decreases, the contrast of an MLC display worsens. Since the resistivity of the liquid-crystal mixture generally decreases over the life of an MLC display due to interaction with the internal surfaces of the display, a high (initial) resistance is very important for displays which must have acceptable resistance values over a long operating period.

The disadvantage of the MLC-TN displays disclosed hitherto is due to their comparatively low contrast, the relatively high viewing angle dependence and the difficulty of producing grey shades in these displays.

Thus, there continues to be a great demand for MLC displays, in particular displays based on a birefringence effect, such as OCB displays, having very high resistivity at the same time as a wide operating temperature range, short response times and low threshold voltage, with the aid of which various grey shades can be produced. Furthermore, there is a great demand for liquid crystalline media for OCB mode displays which exhibit at the same time low viscosities, high birefringence and relatively high positive dielectric anisotropy.

The invention has an object of providing MLC displays, in particular LCoS™ and reflective displays and displays of the OCB mode, which do not have the abovementioned disadvantages, or do so only to a reduced extent, and at the same time have very high resistivities.

Upon further study of the specification and appended claims, further objects and advantages of this invention will become apparent to those skilled in the art.

It has now been found that these and other objects can be achieved if nematic liquid-crystal mixtures containing at least one biphenyl derivative with a terminal alkenyl group are used in these display elements.

The liquid crystalline mixtures according to the present invention are characterized in that they exhibit a broad nematic phase range, a high value of the birefringence, a positive dielectric anisotropy, a low viscosity, and a high UV stability.

Therefore, when using the inventive liquid crystal mixture in an electrooptical display it is possible to reduce the values of the response time and the driving voltage, compared to displays comprising mixtures of the prior art, and at the same time to achieve displays that show a satisfying grey scale performance, a wide viewing angle and a high contrast.

The invention thus also relates to a liquid-crystalline medium based on a mixture of polar compounds having positive dielectric anisotropy, characterized in that it contains one or more compounds of formula I

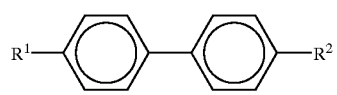

wherein $R^1$ is alkyl or alkoxy with 1 to 15 C atoms, and $R^2$ is alkenyl with 2 to 7 C atoms.

Preferred compounds of formula I are those wherein $R^1$ is alkyl with 1 to 8 C atoms. Very preferably $R^1$ is methyl, ethyl or propyl, in particular methyl.

Further preferred compounds of formula I are those wherein $R^2$ is vinyl, 1E-propenyl, 1E-butenyl, 3E-butenyl or 3E-pentenyl, in particular 3E-butenyl or 3E-pentenyl.

Very preferred are compounds of formula Ia

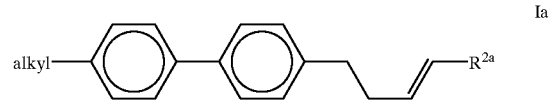

wherein alkyl is an alkyl group with 1 to 8 C atoms, in particular methyl, and $R^{2a}$ is H, methyl, ethyl or n-propyl, in particular methyl.

The liquid crystal mixture preferably in addition comprises one or more terphenyl compounds of formula II

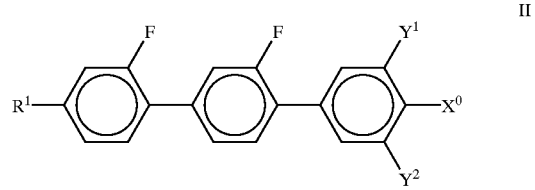

wherein $R^1$ has one of the meanings of formula I, $X^0$ is F, Cl, $CF_3$, $OCF_3$, $OCHF_2$, fluoroalkyl or fluoroalkoxy with up to 7 carbon atoms, and $Y^1$ and $Y^2$ are each independently of one another H or F.

Preferred compounds of formula II are those wherein $X^0$ is F or Cl, in particular those wherein $Y^1$ and $Y^2$ are H.

The liquid crystal mixture preferably comprises in addition one or more polar compounds selected from the formulae III to VIII

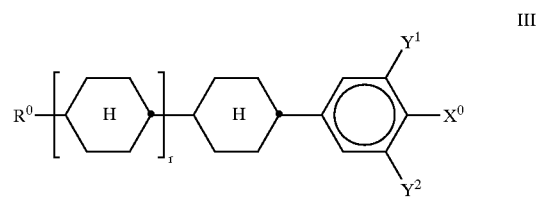

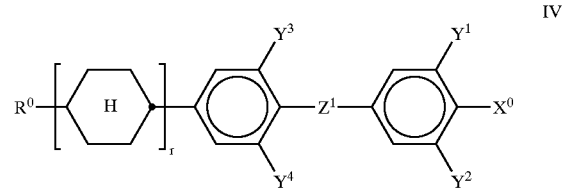

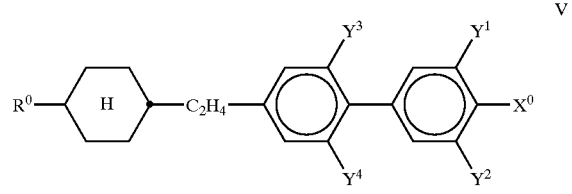

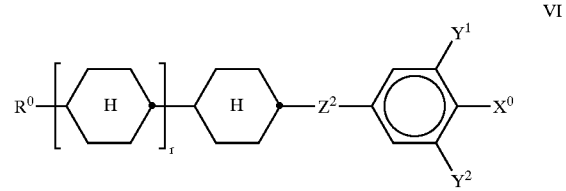

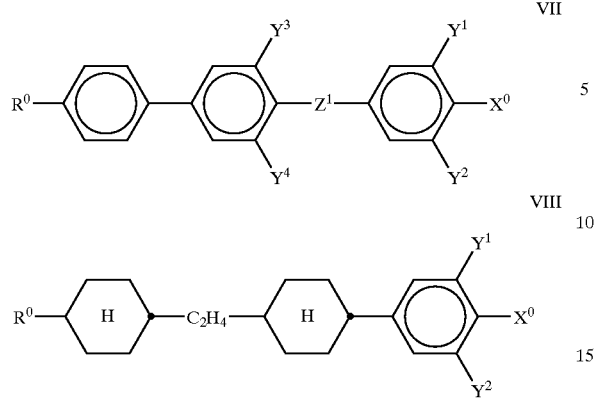

wherein
- R⁰ is alkyl, alkoxy, fluoroalkyl, alkenyl or oxaalkenyl with 1 to 9 C atoms,
- Z¹ is $CF_2O$, $C_2F_4$ or a single bond,
- Z² is $CF_2O$, $C_2F_4$ or $C_2H_4$,
- X⁰ is is F, Cl, $CF_3$, $OCF_3$, $OCHF_2$, fluoroalkyl or fluoroalkoxy with up to 7 carbon atoms,
- Y¹ to Y⁴ are independently of each other H or F, and
- r is 0 or 1.

The compounds of formula III are preferably selected from the following formulae:

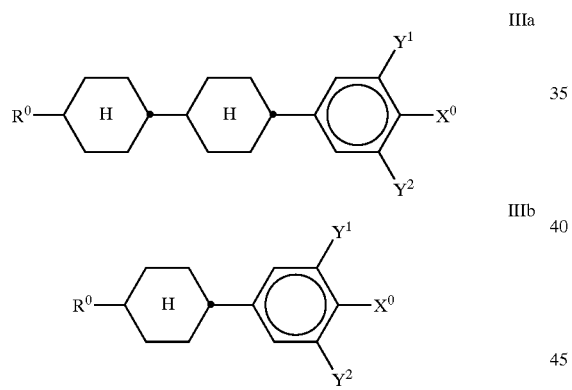

wherein R⁰ and X⁰ have the meanings given above, R⁰ is preferably n-alkyl with 1 to 8 C atoms or alkenyl with 2 to 7 C atoms and X⁰ is preferably F, Cl, $CF_3$, $OCF_3$ or $OCHF_2$, in particular F or $OCF_3$.

Particularly preferably the liquid crystal mixture comprises one or more compounds of formula IIIa1

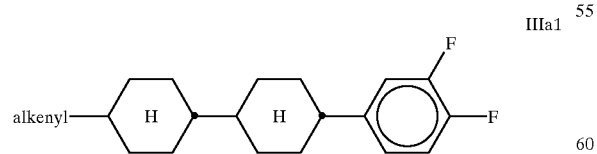

wherein alkenyl is vinyl, 1E-propenyl, 1E-butenyl, 3E-butenyl or 3E-pentenyl, in particular 3E-butenyl or 3E-pentenyl, in particular vinyl.

The compounds of formula IV are preferably selected from the following formulae

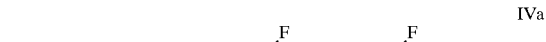
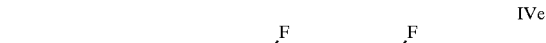
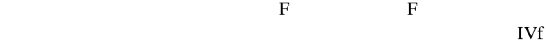
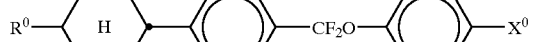
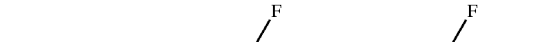
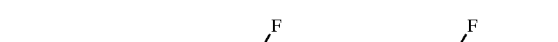
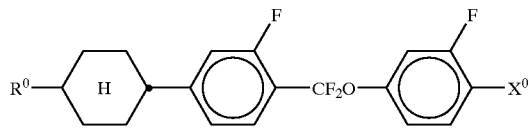

IVk

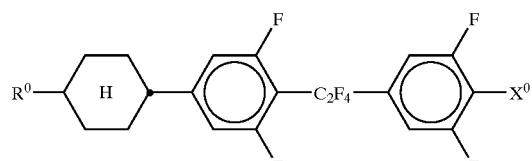

IVm

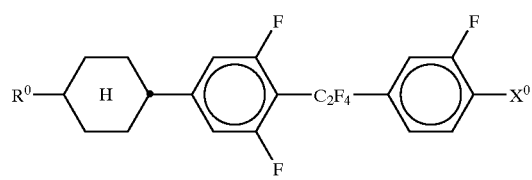

IVn

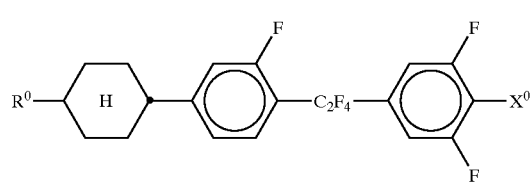

IVo

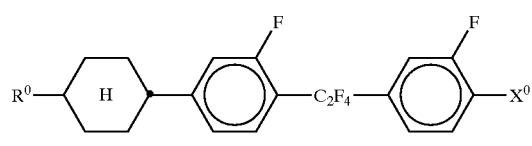

wherein $R^0$ and $X^0$ have the meanings given above, $R^0$ is preferably n-alkyl with 1 to 8 C atoms or alkenyl with 2 to 7 C atoms, and $X^0$ is preferably F, Cl, $CF_3$, $OCF_3$ or $OCHF_2$, in particular F or $OCF_3$.

Particularly preferred are compounds of formula IVa, IVb and IVc, in particular wherein $X^0$ is F. Further preferred are compounds of formula IVf.

The compounds of formula VI are preferably selected from the following formulae

VIa

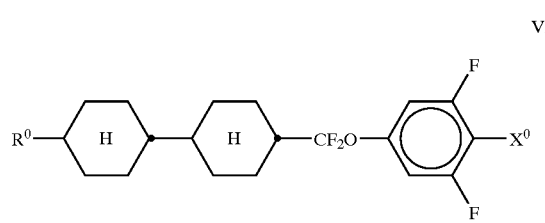

VIb

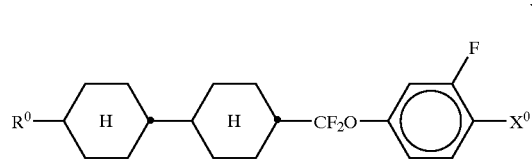

VIc

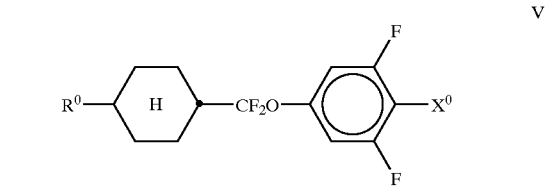

VId

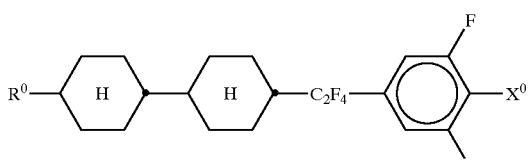

VIe

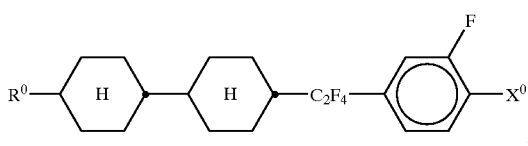

VIf

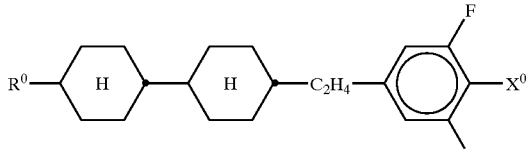

VIg

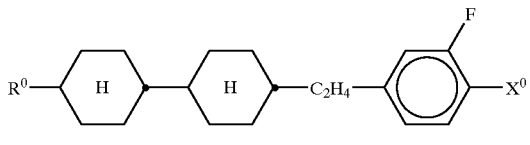

wherein $R^0$ and $X^0$ have the meanings given above, $R^0$ is preferably n-alkyl with 1 to 8 C atoms or alkenyl with 2 to 7 C atoms, and $X^0$ is preferably F, Cl, $CF_3$, $OCF_3$ or $OCHF_2$, in particular F or $OCF_3$.

Particularly preferred are compounds of formula VIa, VIb and VIc.

The compounds of formula VII are preferably selected from the following formulae VIIa

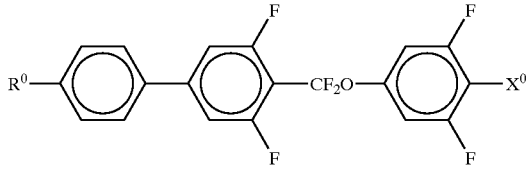

VIIb

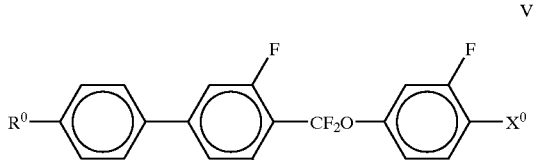

VIIc

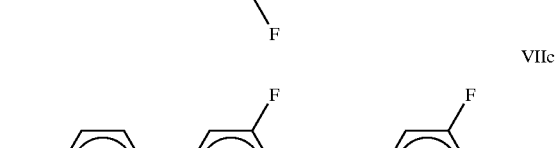

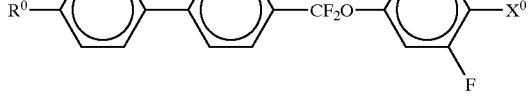

VIId
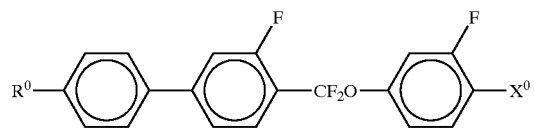

IX
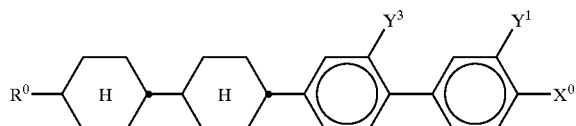

VIIe
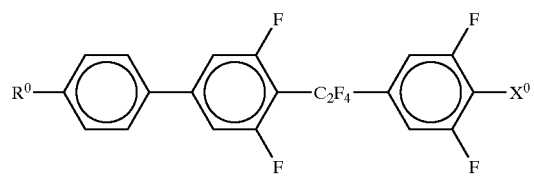

X
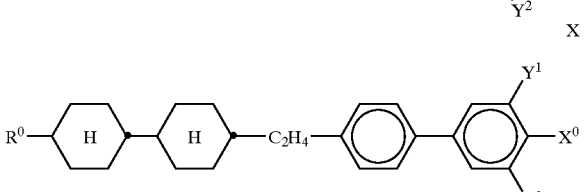

VIIf
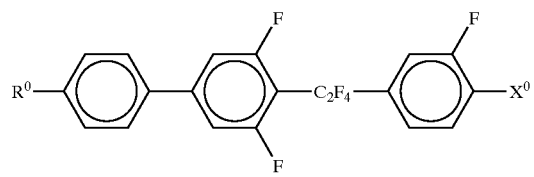

XI
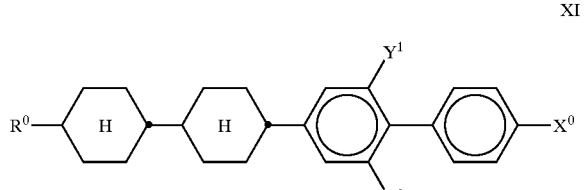

VIIg
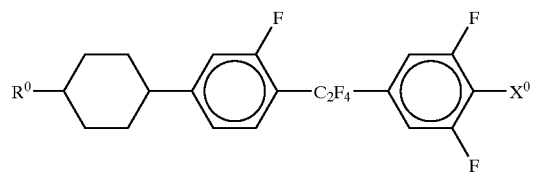

XII
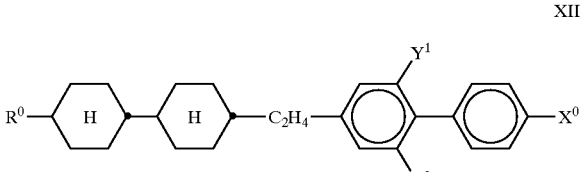

VIIh
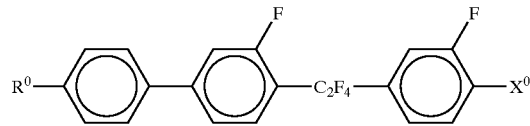

XIII
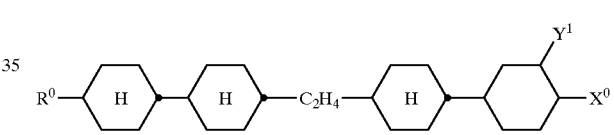

VIIi
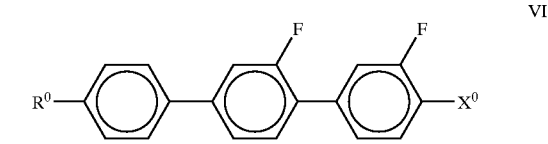

XIV
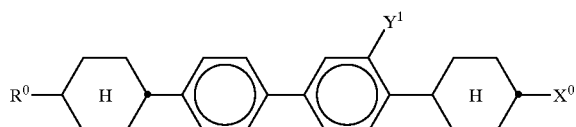

VIIk
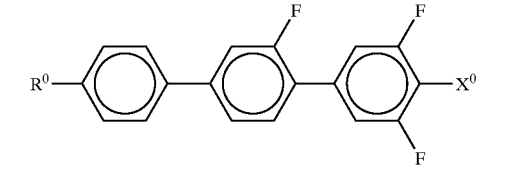

XV
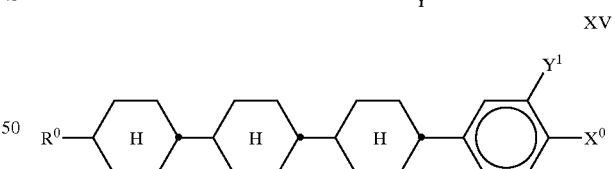

XVI
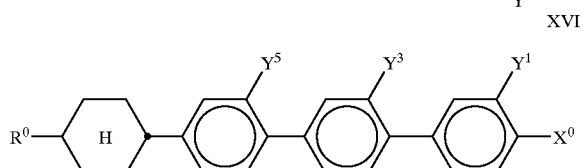

wherein $R^0$ and $X^0$ have the meanings given above, $R^0$ is preferably n-alkyl with 1 to 8 C atoms or alkenyl with 2 to 7 C atoms, and $X^0$ is preferably F, Cl, $CF_3$, $OCF_3$ or $OCHF_2$, in particular F or $OCF_3$.

Particularly preferred are compounds of formula VIIa, VIIb and VIIk, in particular those, wherein $X^0$ is F.

The liquid crystal mixture preferably comprises in addition one or more four-ring compounds selected from the formulae IX to XVI.

wherein $R^0$ and $X^0$ have the meanings given above and $Y^1$, $Y^2$, $Y^3$, $Y^4$ and $Y^5$ are independently of each other H or F. $R^0$ is preferably n-alkyl with 1 to 8 C atoms or alkenyl with 2 to 7 C atoms. $X^0$ is preferably F, Cl, $CF_3$, $OCF_3$ or $OCHF_2$, in particular F or $OCF_3$. $Y^4$ and $Y^5$ are preferably H.

Especially preferred are compounds of formula XVI, wherein $Y^1$ and $Y^3$ are F, $Y^2$ is H or F and $Y^4$ and $Y^5$ are H.

The liquid crystal mixture preferably comprises in addition one or more compounds selected from the formulae XVII to XIX.

XVII

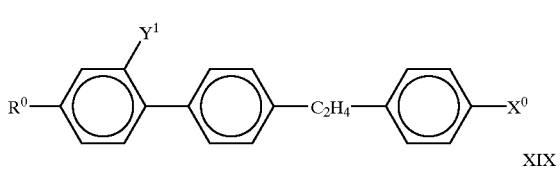

XVIII

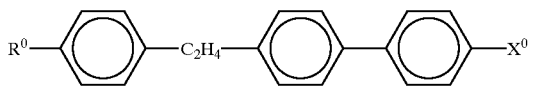

XIX wherein $R^0$, $Y^1$ and $X^0$ have the meanings given above, and the phenylene rings are optionally mono- or polysubstituted with F, Cl or CN. Preferably $R^0$ is n-alkyl with 1 to 8 C atoms or alkenyl with 2 to 7 C atoms, $X^0$ is F, Cl, $CF_3$, $OCF_3$ or $OCHF_2$, in particular F or Cl, and at least one phenylene ring is substituted with F.

Preferred compounds of formula XVII are those of formula XVIIa

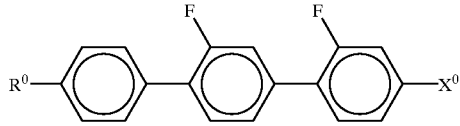

XVIIa wherein $X^0$ is F or Cl, in particular F.

Preferred compounds of formula XVIII are those wherein $Y^1$ is F and $X^0$ is F or Cl, in particular F.

The liquid crystal mixture preferably comprises in addition one or more compounds selected from the formulae XX to XXIII.

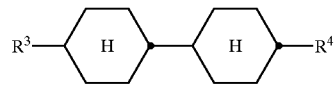

XX

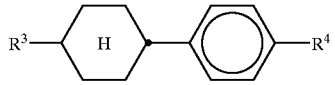

XXI

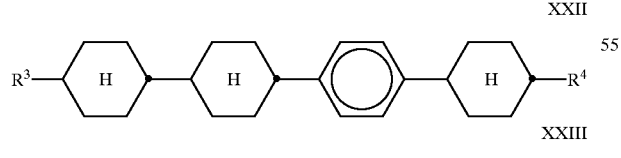

XXII

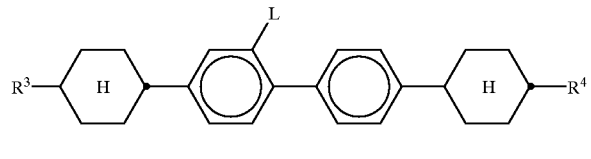

XXIII wherein $R^3$ and $R^4$ have independently of each other one of the meanings of $R^1$ in formula I and L is H or F.

In the compounds of formula XX $R^3$ and $R^4$ are preferably alkyl with 1 to 8 C atoms or alkenyl with 2 to 7 C atoms.

In the compounds of formula XXI, XXII and XXIII $R^3$ and $R^4$ are preferably alkyl or alkoxy with 1 to 8 C atoms.

The invention furthermore relates to an electrooptical display, preferably a display having active matrix addressing based on the OCB effect, reflective display or an LCoS™ display, characterized in that it contains, as dielectric, a liquid-crystalline medium as described above.

Preferably the mixture consists essentially of compounds selected from the group of the general formulae I, II, and III to XXIII.

Preferred embodiments of the the present invention relate to mixtures that contain:

- at least 5%, preferably 5 to 30% by weight of one or more compounds of the formula I.
- at least 10%, preferably 10 to 45% by weight of one or more compounds of the formula II.
- 20 to 75%, preferably 25 to 68% by weight of one or more compounds of formula IV, in particular selected of formula IVa, IVb and IVc

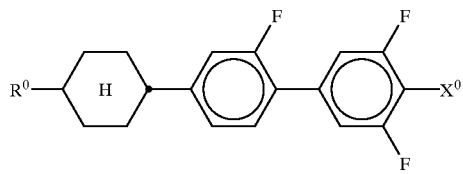

IVa

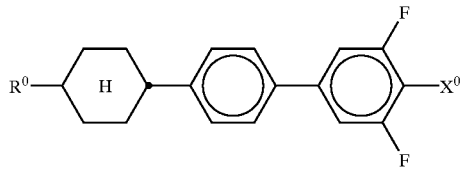

IVb

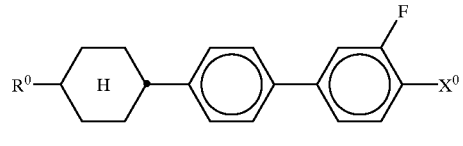

IVc wherein $R^0$ and $X^0$ have the meanings given above.

- at least one compound of formula Ia, in particular wherein R is $CH_3$ and $R^{2a}$ is $CH_3$.
- at least one compound formula II wherein $X^0$ is Cl and $Y^1$ and $Y^2$ are H.
- at least one compound of formula IIIa1, in particular wherein alkenyl is vinyl.
- at least one compound of formula VII, in particular of formula VIIk, wherein $X^0$ is F.
- at least one compound of formula IX, in particular wherein $X^0$, $Y^1$, $Y^2$ and $Y^3$ are F.
- one or more compounds of formula XVI, wherein $X^0$ is F, $OCF_3$ or $OCHF_2$, $Y^1$ and $Y^3$ are F, $Y^2$ is H or F and $Y^4$ and $Y^5$ are H.
- one or more fluorinated terphenyls of the following formulae

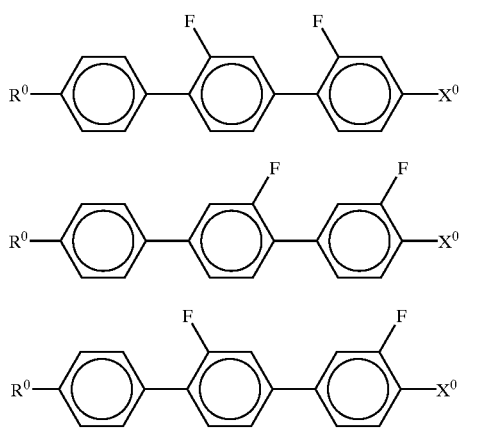

XVIIa

XVIIb

XVIIc wherein $R^0$ and $X^0$ have the meaning given in formula I, and $X^0$ is preferably F or Cl.

at least one compound of formula XXI, wherein L is H or F.

The compounds of formula I and their synthesis are described in the German patent application DE10128492.6. The compounds of formula II-XXIII are known from prior art or can be prepared according to known methods.

By using compounds of formula I it is possible to obtain inventive liquid crystalline mixtures with at the same time high birefringence and high clearing point. The use of compounds of formula II leads to high values of the birefringence in the inventive mixtures.

The liquid-crystal mixture preferably has a nematic phase range of at least 75 K, a clearing point above 60° C., in particular above 70° C.

The birefringence Δn in the liquid-crystal mixture is preferably at least 0.18, very preferably at least 0.19, in particular 0.20 or higher. The dielectric anisotropy is preferably greater than +6, very preferably at least +7.5.

The mixtures according to the present invention usually are based on the medium polar components having the indicated core structure and other non-cyano components. Of course, however, such mixtures can also additionally contain known cyano LC components, preferably compounds of the formula XXIV

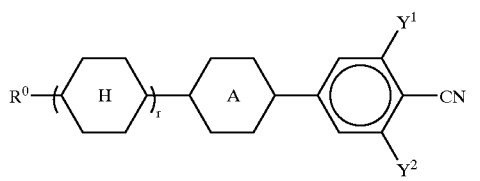

XXIV wherein $R^0$, r, $Y^1$ and $Y^2$ have the meanings given above, and

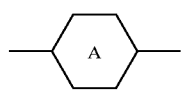

is trans-1,4-cyclohexylene or 1,4-phenylene, if extremely high values for the HR are not needed, e.g. for TN or STN-use. The resulting mixtures are important for achieving very broad nematic phase ranges including very low temperatures (outdoor use).

The mixtures are preferably based on halogenated components of medium polarity and/or are essentially free of cyano components.

In the components of the formulae I to XXIV, $R^0$, $R^1$, $R^3$, and $R^4$ are preferably a straight-chained alkyl radical of 1 to 7 carbon atoms or is straight-chained methoxy alkyl (methoxymethyl, methoxyethyl, methoxypropyl, methoxybutyl, methoxypentyl, methoxyhexyl, methoxyheptyl).

The term "alkenyl" comprises straight chain and branched alkenyl groups with 2 to 7 C atoms. Straight chain alkenyl groups are preferred. Further preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Of these, especially preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Alkenyl groups with up to 5 C atoms are particularly preferred.

The preparation of the mixtures according to the invention is effected in the conventional manner. In general, the desired amount of the components which is used in the smaller amount is dissolved in the components which constitutes the main constituent, preferably at elevated temperature. If this temperature is chosen to be above the clearing point of the main constituent, the completeness of the process of dissolving can be observed particularly easily.

However, it is also possible to mix solutions of the components in a suitable organic solvent, for example acetone, chloroform or methanol, and to remove the solvent by distillation.

By means of suitable additives the liquid crystal phases according to the invention can be modified in such a way that they can be used in any hitherto disclosed kind of AMD.

The entire disclosure(s) of all applications, patents and publications, cited above or below, and of corresponding European Application No. 01115344.2, filed Jun. 26, 2001, is hereby incorporated by reference.

EXAMPLES

The examples below serve to illustrate the invention without limiting it. In the examples, the melting point and clearing point of a liquid crystal substance are given in degrees Celsius. The percentages are by weight.

In the present patent application and in the following examples all chemical structures of LC compounds are given by acronyms the transformation of which into chemical formulae is done as shown in the following. All residues $C_nH_{2n+1}$ and $C_mH_{2m+1}$ are straight-chained alkyl groups with n resp. m carbon atoms. The code of Table B is self-explanatory. In Table A only the acronym for the core structure is given. In the examples, this acronym is followed by a dash and a code for the substituents $R^1$, $R^2$, $L^1$ and $L^2$ as follows:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |

-continued

| Code for $R^1$, $R^2$, $L^1$, $L^2$ | $R^1$ | $R^2$ | $L^1$ | $L^2$ |
|---|---|---|---|---|
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | $CF_3$ | H | H |
| nOCF$_3$ | $C_nH_{2n+1}$ | $OCF_3$ | H | H |
| nOCF$_2$ | $C_nH_{2n+1}$ | $OCHF_2$ | H | H |
| n-V | $C_nH_{2n+1}$ | —CH=CH$_2$ | H | H |
| V-F | CH$_2$=CH— | F | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| nOCCF$_2$.F.F | $C_nH_{2n+1}$ | $OCH_2CF_2H$ | F | F |

TABLE A

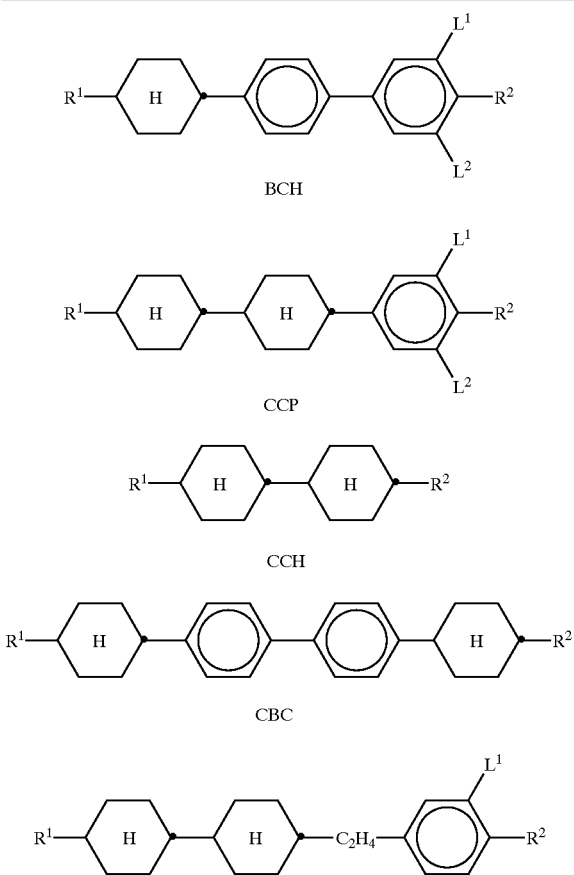

TABLE A-continued

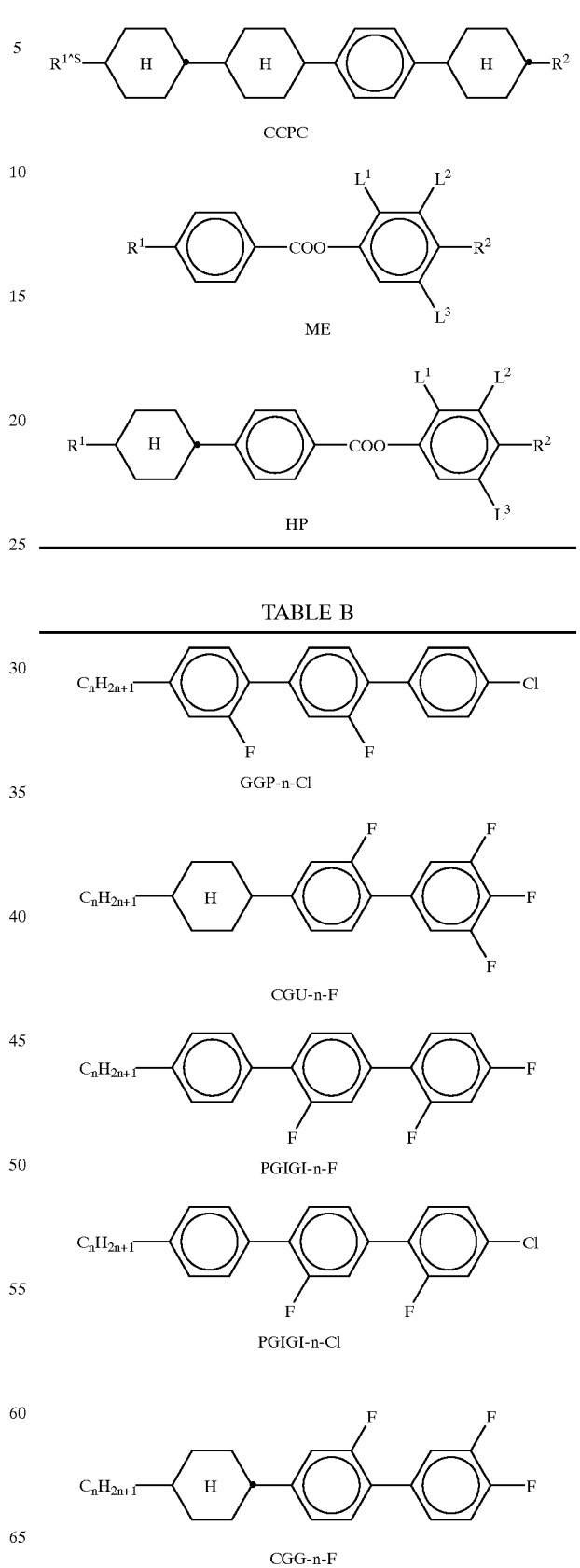

TABLE B-continued

CC-nV-Vm

PP-n-kVm

CCG-V-F

CBC-nm(F)

CCGU-n-F

The following abbreviations are used

| | |
|---|---|
| Δn | denotes the optical anisotropy measured at 20° C. and 589 nm |
| $n_e$ | denotes the extraordinary refractive index at 20° C. and 589 nm |
| Δε | denotes the dielectric anisotropy at 20° C. |
| $ε_\parallel$ | denotes the dielectric constant in the parallel direction to the molecular axis |
| cp | denotes the clearing point [° C.] |

Example 1

A liquid crystal mixture is prepared that comprises

| | | | |
|---|---|---|---|
| GGP-3-Cl | 9.0% | cp | 99.0 |
| GGP-5-Cl | 26.0% | Δn | 0.1999 |
| PGIGI-3-F | 13.0% | $n_e$ | 1.7143 |
| BCH-3F.F | 8.0% | Δε | +8.8 |
| BCH-5F.F | 6.0% | $ε_\parallel$ | 13.2 |
| BCH-3F.F.F | 10.0% | | |
| BCH-5F.F.F | 9.0% | | |
| CBC-33F | 2.0% | | |
| CBC-53F | 3.0% | | |
| CCG-V-F | 6.0% | | |
| PP-1-2V1 | 8.0% | | |

Example 2

A liquid crystal mixture is prepared that comprises

| | | | |
|---|---|---|---|
| GGP-3-Cl | 9.0% | cp | 98.0 |
| GGP-5-Cl | 26.0% | Δn | 0.2007 |
| PGIGI-3-F | 13.0% | $n_e$ | 1.7163 |
| BCH-3F.F | 7.0% | | |
| BCH-5F.F | 7.0% | | |
| BCH-3F.F.F | 8.0% | | |
| BCH-5F.F.F | 8.0% | | |
| CBC-53F | 5.0% | | |
| CCG-V-F | 7.0% | | |
| PP-1-2V1 | 10.0% | | |

Example 3

A liquid crystal mixture is prepared that comprises

| | | | |
|---|---|---|---|
| GGP-3-Cl | 9.0% | cp | 102.0 |
| GGP-5-Cl | 26.0% | Δn | 0.2000 |
| PGIGI-3-F | 13.0% | $n_e$ | 1.7142 |
| BCH-3F.F | 7.0% | | |
| BCH-5F.F | 7.0% | | |
| BCH-3F.F.F | 7.0% | | |
| BCH-5F.F.F | 8.0% | | |
| CBC-33F | 2.0% | | |
| CBC-53F | 4.0% | | |
| CCG-V-F | 9.0% | | |
| PP-1-2V1 | 8.0% | | |

Example 4

A liquid crystal mixture is prepared that comprises

| | | | |
|---|---|---|---|
| GGP-3-Cl | 10.0% | cp | 101.0 |
| GGP-5-Cl | 26.0% | Δn | 0.2002 |
| PGIGI-3-F | 13.0% | $n_e$ | 1.7154 |
| BCH-3F.F | 5.0% | Δε | +8.3 |
| BCH-5F.F | 7.0% | $ε_\parallel$ | 12.5 |
| BCH-3F.F.F | 9.0% | | |
| BCH-5F.F.F | 10.0% | | |
| CBC-33F | 3.0% | | |
| CBC-53F | 3.0% | | |
| CCG-V-F | 6.0% | | |
| PP-1-2V1 | 8.0% | | |

Example 5

A liquid crystal mixture is prepared that comprises

| | | | |
|---|---|---|---|
| GGP-3-Cl | 10.0% | cp | 101.0 |
| GGP-5-Cl | 26.0% | Δn | 0.2028 |
| PGIGI-3-F | 13.0% | $n_e$ | 1.7182 |
| BCH-3F.F | 7.0% | Δε | +7.7 |
| BCH-5F.F | 7.0% | $ε_\parallel$ | 11.9 |
| BCH-3F.F.F | 7.0% | | |
| BCH-5F.F.F | 7.0% | | |
| CBC-53F | 6.0% | | |
| CCG-V-F | 7.0% | | |
| PP-1-2V1 | 10.0% | | |

Example 6

A liquid crystal mixture is prepared that comprises

| | | | |
|---|---|---|---|
| GGP-3-Cl | 11.0% | cp | 101.0 |
| GGP-5-Cl | 26.0% | Δn | 0.2010 |
| PGIGI-3-F | 12.0% | $n_e$ | 1.7161 |
| BCH-3F.F.F | 12.5% | Δε | +9.3 |
| BCH-5F.F.F | 16.5% | $\epsilon_\parallel$ | 13.5 |
| CBC-33F | 3.5% | | |
| CBC-53F | 4.5% | | |
| CCG-V-F | 6.0% | | |
| PP-1-2V1 | 8.0% | | |

Example 7

A liquid crystal mixture is prepared that comprises

| | | | |
|---|---|---|---|
| GGP-3-Cl | 12.0% | cp | 100.5 |
| GGP-5-Cl | 27.0% | Δn | 0.2003 |
| PGIGI-3-F | 10.0% | $n_e$ | 1.7151 |
| BCH-3F.F.F | 12.5% | Δε | +10.2 |
| BCH-5F.F.F | 15.5% | $\epsilon_\parallel$ | 14.5 |
| CBC-33F | 3.0% | | |
| CBC-53F | 4.0% | | |
| CCG-V-F | 8.0% | | |
| PP-1-2V1 | 5.0% | | |
| PGU-2-F | 1.0% | | |
| PGU-3-F | 2.0% | | |

Example 8

A liquid crystal mixture is prepared that comprises

| | | | |
|---|---|---|---|
| GGP-3-Cl | 12.0% | cp | 101.5 |
| GGP-5-Cl | 27.0% | Δn | 0.2001 |
| PGIGI-3-F | 8.0% | $n_e$ | 1.7145 |
| BCH-3F.F.F | 13.5% | Δε | +9.7 |
| BCH-5F.F.F | 17.5% | $\epsilon_\parallel$ | 13.9 |
| CBC-33F | 4.0% | | |
| CBC-53F | 4.0% | | |
| CCG-V-F | 5.5% | | |
| PP-1-2V1 | 8.5% | | |

Comparison Example

A liquid crystal mixture is prepared that comprises

| | | | |
|---|---|---|---|
| GGP-5-Cl | 16.0% | cp | 102.0 |
| BCH-2F.F | 11.0% | Δn | 0.1610 |
| BCH-3F.F | 11.0% | $n_e$ | 1.6692 |
| BCH-5F.F | 6.0% | Δε | +10.9 |
| CGU-2-F | 9.0% | $\epsilon_\parallel$ | 15.3 |
| CGU-3-F | 9.0% | | |
| CGU-5-F | 8.0% | | |
| BCH-3F.F.F | 8.0% | | |
| CCGU-3-F | 7.0% | | |
| BCH-32 | 10.0% | | |
| CBC-33 | 3.0% | | |
| CBC-53 | 2.0% | | | and exhibits a significantly lower optical anisotropy than the mixtures of examples 1 to 8 comprising a compound of formula I (PP-1-2V1).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium based on a mixture of polar compounds of positive dielectric anisotropy, which comprise one or more compounds of formula I

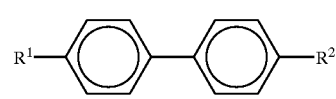

I wherein $R^1$ is alkyl or alkoxy with 1 to 15 C atoms, and $R^2$ is alkenyl with 2–7 C atoms, and one or more compounds of the formula II

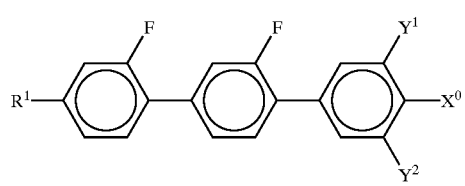

II wherein $R^1$ has the meaning given under formula I, $X^0$ is F, Cl, $CF_3$, $OCF_3$, $OCHF_2$, fluoroalkyl or fluoroalkoxy with up to 7 carbon atoms, and $Y^1$ and $Y^2$ are each independently of one another H or F.

2. A medium according to claim 1, which additionally comprises one or more compounds selected from the formulae III to VIII:

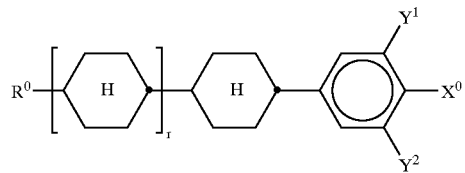

III

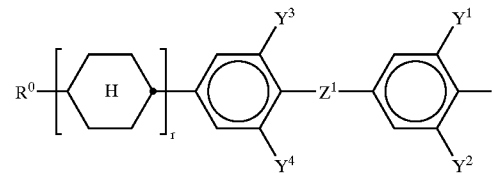

IV

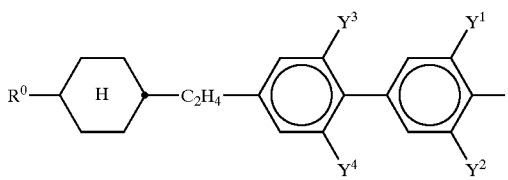

V

-continued

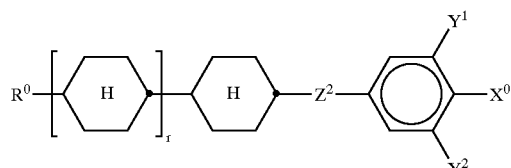
VI

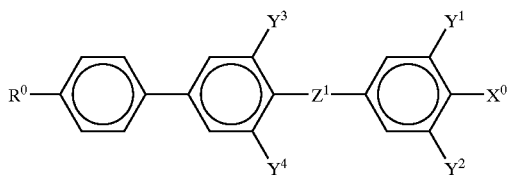
VII

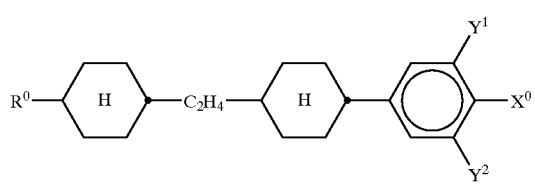
VIII wherein

R⁰ is alkyl, alkoxy, fluoroalkyl, alkenyl or oxaalkenyl with 1 to 9 C atoms, $Z^1$ is $CF_2O$, $C_2F_4$ or a single bond, $Z^2$ is $CF_2O$, $C_2F_4$ or $C_2H_4$, $X^0$ is F, Cl, $CF_3$, $OCF_3$, $OCHF_2$, fluoroalkyl or fluoroalkoxy with up to 7 carbon atoms, $Y^1$ to $Y^4$ are independently of each other H or F, and r is 0 or 1.

3. A medium according to claim 1, which additionally comprises one or more compounds selected from the formulae IX to XVI;

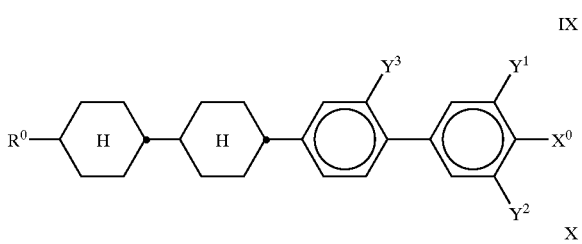
IX

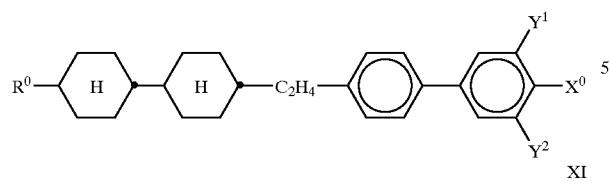
X

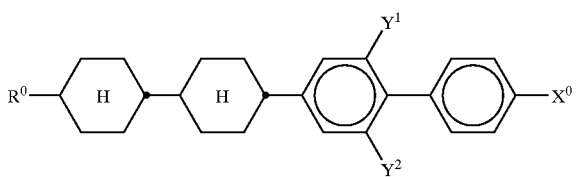
XI

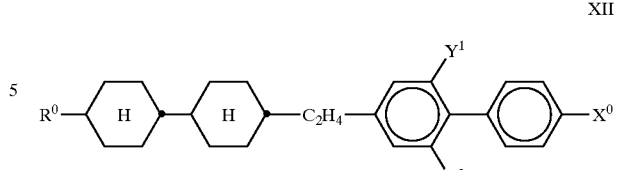
XII

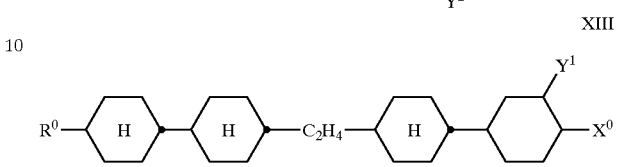
XIII

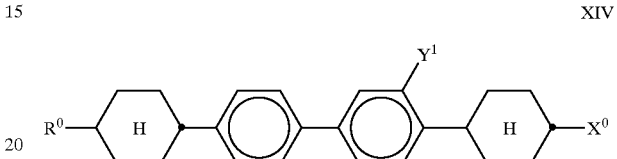
XIV

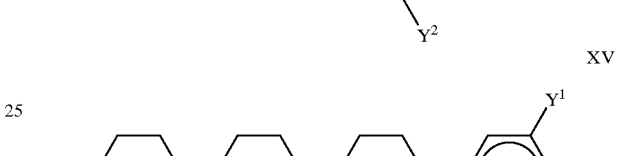
XV

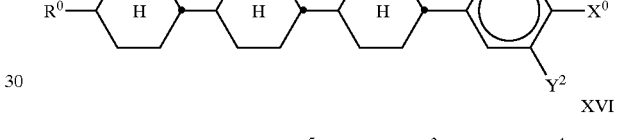
XVI wherein

R⁰ is alkyl, alkoxy, fluoroalkyl, alkenyl or oxaalkenyl with 1 to 9 atoms, $X^0$ is F, Cl, $CF_3$, $OCF_3$, $OCHF_2$, fluoroalkyl or fluoroalkoxy with up to 7 carbon atoms, and to are independently of each other H or F.

4. A medium according to claim 2, which additionally comprises one or more compounds selected from the formulae IX to XVI:

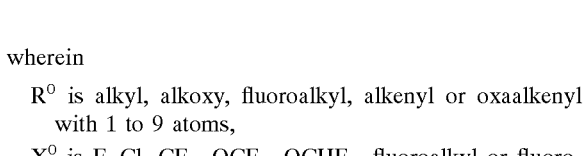
IX

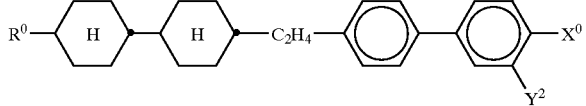
X

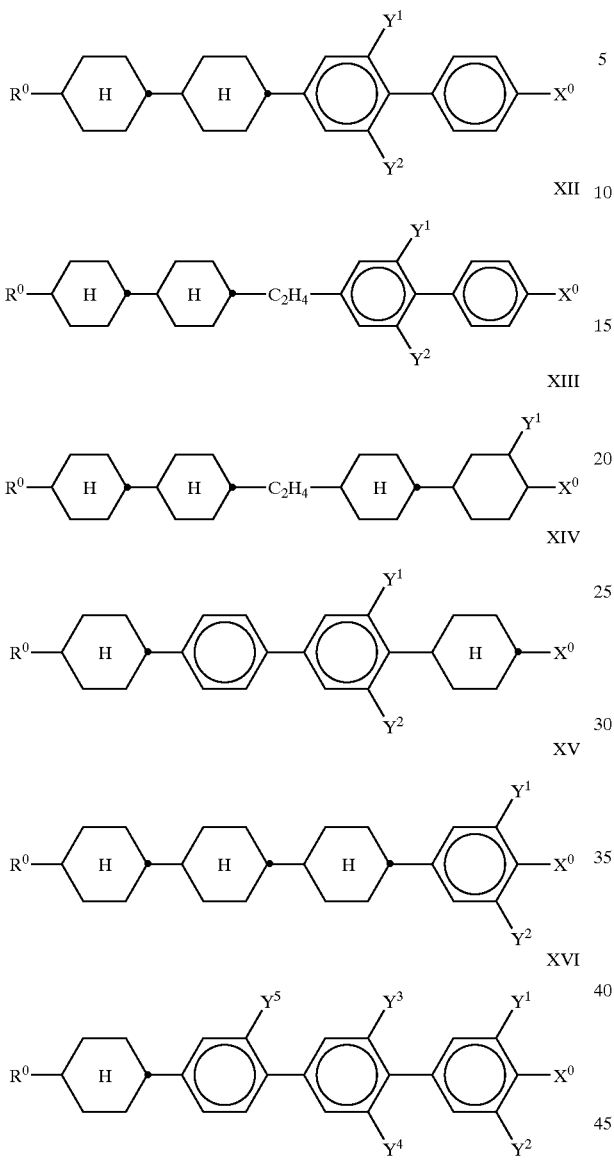

wherein

R⁰ is alkyl, alkoxy, fluoroalkyl, alkenyl or oxaalkenyl with 1 to 9 atoms,

X⁰ is F, Cl, CF₃, OCF₃, OCHF₂, fluoroalkyl or fluoroalkoxy with up to 7 carbon atoms, and $Y^1$ to $Y^5$ are independently of each other H or F.

5. A medium according to claim 1, which additionally comprises one or more compounds selected from the formulae XVII to XIX:

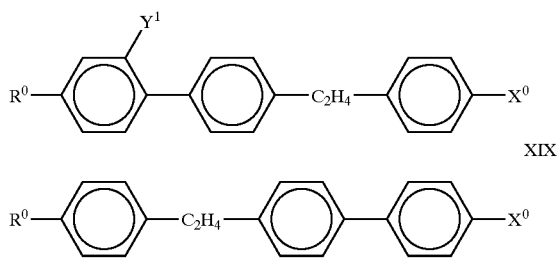

wherein

R⁰ is alkyl, alkoxy, fluoroalkyl, alkenyl or alkenyl or oxaalkenyl with 1 to 9 C atoms, X⁰ is F, Cl, CF₃, OCF₃, OCHF₃, fluoroalkyl or fluoroalkoxy with up to 7 carbon atoms, and $Y^1$ is H or F.

6. A medium according to claim 1, which additionally comprises one or more compounds selected from the formulae XX to XXIII

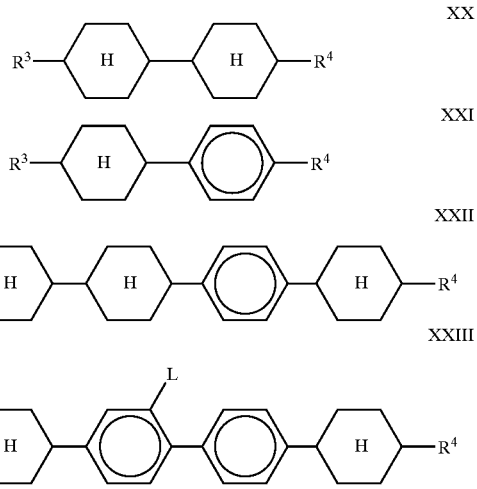

wherein $R^3$ and $R^4$ have independently of each other one of the meanings of $R^1$ in formula I and L is H or F.

7. A medium according to claim 1, which comprises one or more compounds of formula Ia

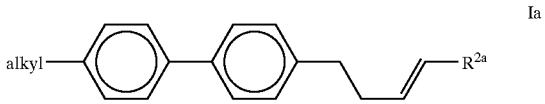

wherein alkyl is an alkyl group with 1 to 8 C atoms and $R^{2a}$ is H or methyl.

8. A medium according to claim 2, which comprises 20 to 75% by weight of one or more compounds selected from formulae IVa, IVb and IVc IVa
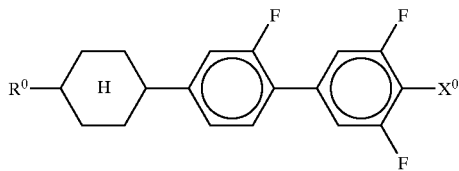

IVb
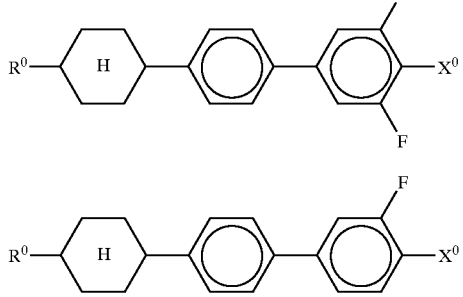

IVc

wherein R⁰ and X⁰ have the meaning given above.

9. A medium according to claim 1, which comprises 5 to 15% by weight of one or more compounds of the formula I.

10. A medium according to claim 1, which comprises 10 to 45% by weight of one or more compounds of formula II.

11. A liquid crystal display comprising a liquid crystal mixture according to claim 1.

12. An electrooptical liquid-crystal display of LCOS or OCB mode containing a liquid-crystal mixture according to claim 1.

13. A medium of claim 1, which comprises a compound of the formula II wherein $X^0$ is Cl and $Y^1$ and $Y^2$ are H.

14. A medium of claim 2, which comprises at least one compound of the formula VII wherein $X^0$ is F.

15. A liquid-crystalline medium based on a mixture of polar compounds of positive dielectric anisotropy, which comprises:

one or more compounds of formula I

I
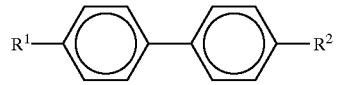

wherein $R^1$ is alkyl or alkoxy with 1 to 15 C atoms, and
$R^2$ is alkenyl with 2–7 C atoms, and one or more compounds selected from the formulae IX to XVI;

IX
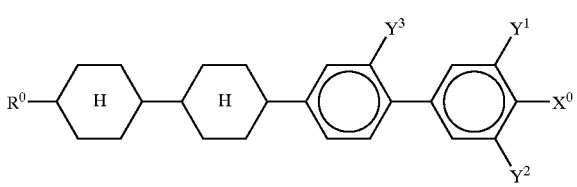

X
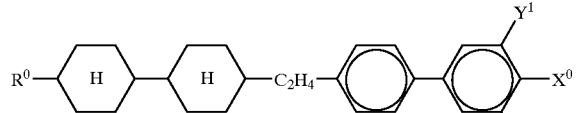

XI
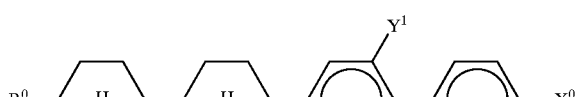

XII
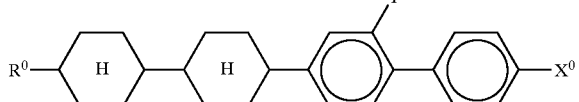

XIII
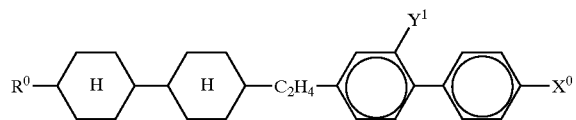

XIV

XV

XVI

wherein $R^0$ is alkyl, alkoxy, fluoroalkyl, alkenyl or oxaalkenyl with 1 to 9 atoms, $X^0$ is F, Cl, CF$_3$, OCF$_3$, OCHF$_2$, fluoroalkyl or fluoroalkoxy with up to 7 carbon atoms, and $Y^1$ to $Y^5$ are independently of each other H or F.

16. A medium according to claim 15, which additionally comprises one or more compounds selected from the formulae III to VIII:

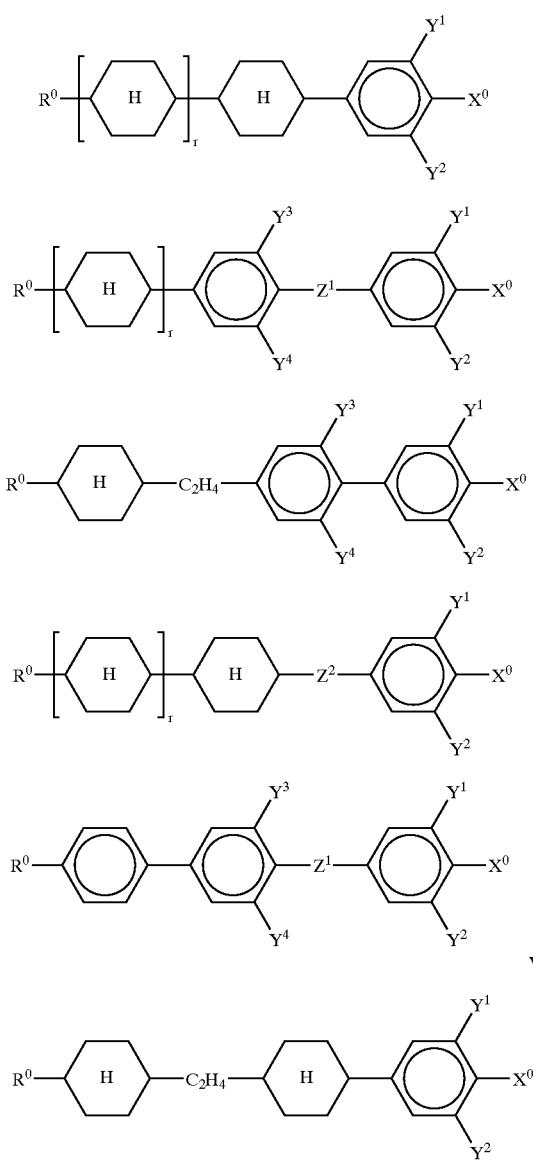

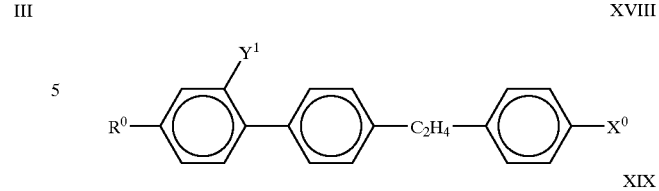

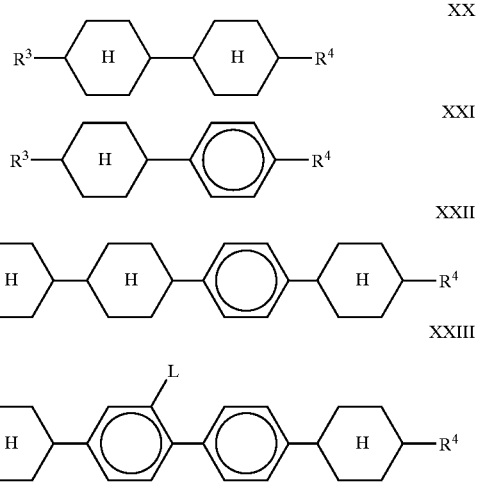

wherein

R⁰ is alkyl, alkoxy, fluoroalkyl, alkenyl or oxaalkenyl with 1 to 9 C atoms,

Z¹ is CF₂O, C₂F₄ or a single bond,

Z² is CF₂O, C₂F₄ or C₂H₄

X⁰ is F, Cl, CF₃, OCF₃, OCHF₂, fluoroalkyl or fluoroalkoxy with up to 7 carbon atoms, Y¹ to Y⁴ are independently of each other H or F, and r is 0 or 1.

17. A medium according to claim 15, which additionally comprises one or more compounds selected from the formulae XVII to XIX:

wherein

R⁰ is alkyl, alkoxy, fluoroalkyl, alkenyl or alkenyl or oxaalkenyl with 1 to 9 C atoms, X⁰ is F, Cl, CF₃, OCF₃, OCHF₃, fluoroalkyl or fluoroalkoxy with up to 7 carbon atoms, and Y¹ is H or F.

18. A medium according to claim 15, which additionally comprises one or more compounds selected from the formulae XX to XXIII wherein R³ and R⁴ have independently of each other one of the meanings of R¹ in formula I and L is H or F.

19. A medium according to claim which 15, which comprises one or more compounds of formula Ia

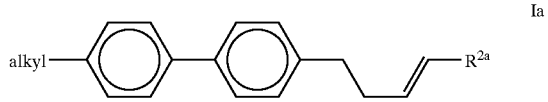

wherein alkyl is an alkyl group with 1 to 8 C atoms and R²ᵃ is H or methyl.

20. A medium according to claim which 16, which comprises 20 to 75% by weight of one or more compounds selected from formulae IVa, IVb and IVc IVa
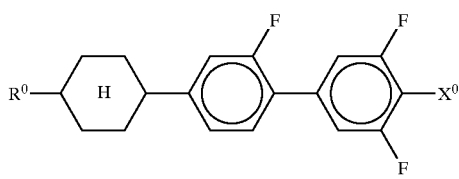

IVb
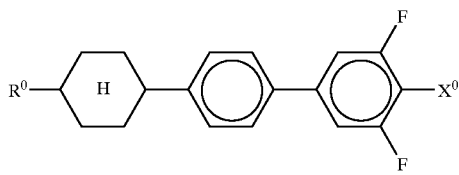

IVc
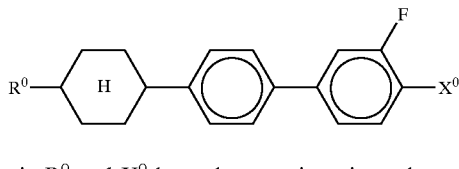

wherein $R^0$ and $X^0$ have the meaning given above.

21. A medium according to claim 15, which comprises 5 to 15% by weight of one or more compounds of the formula I.

22. A liquid crystal display comprising a liquid crystal mixture according to claim 15.

23. An electrooptical liquid-crystal display of LCOS or OCB mode containing a liquid-crystal mixture according to claim 15.

24. A liquid-crystalline medium based on a mixture of polar compounds of positive dielectric anisotropy, which comprises:

one or more compounds of formula I

I
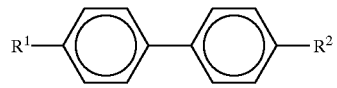

wherein
$R^1$ is alkyl or alkoxy with 1 to 15 C atoms, and
$R^2$ is alkenyl with 2–7 C atoms, and one or more compounds selected from the formulae XVII to XIX:

XVII

XVIII
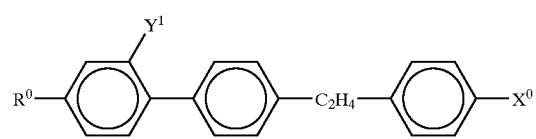

XIX
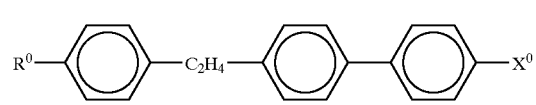

wherein
$R^0$ is alkyl, alkoxy, fluoroalkyl, alkenyl or alkenyl or oxaalkenyl with 1 to 9 C atoms,
$X^0$ is F, Cl, $CF_3$, $OCF_3$, $OCHF_2$, fluoroalkyl or fluoroalkoxy with up to 7 carbon atoms, and
$Y^1$ is H or F.

25. A medium according to claim 24, which additionally comprises one or more compounds selected from the formulae XX to XXIII XX
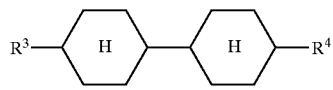

XXI
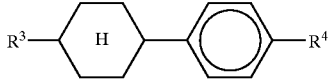

XXII
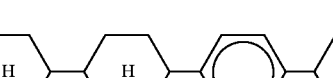

XXIII
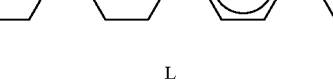

wherein $R^3$ and $R^4$ have independently of each other one of the meanings of $R^1$ in formula I and L is H or F.

26. A medium according to claim 24, which comprises one or more compounds of formula Ia Ia
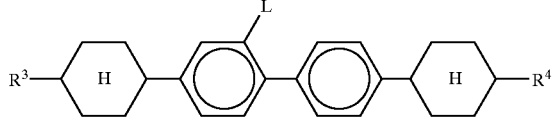

wherein alkyl is an alkyl group with 1 to 8 C atoms and $R^{2a}$ is H or methyl.

27. A medium according to claim 24, which comprises 5 to 15% by weight of one or more compounds of the formula I.

28. A liquid crystal display comprising a liquid crystal mixture according to claim 24.

29. An electrooptical liquid-crystal display of LCOS or OCB mode containing a liquid-crystal mixture according to claim 24.

30. A liquid-crystalline medium based on a mixture of polar compounds of positive dielectric anisotropy, which comprises:

one or more compounds of formula I

I
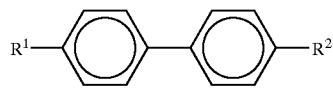

wherein $R^1$ is alkyl or alkoxy with 1 to 15 C atoms, and $R^2$ is alkenyl with 2–7 C atoms, and one or more compounds selected from the formulae III to VIII:

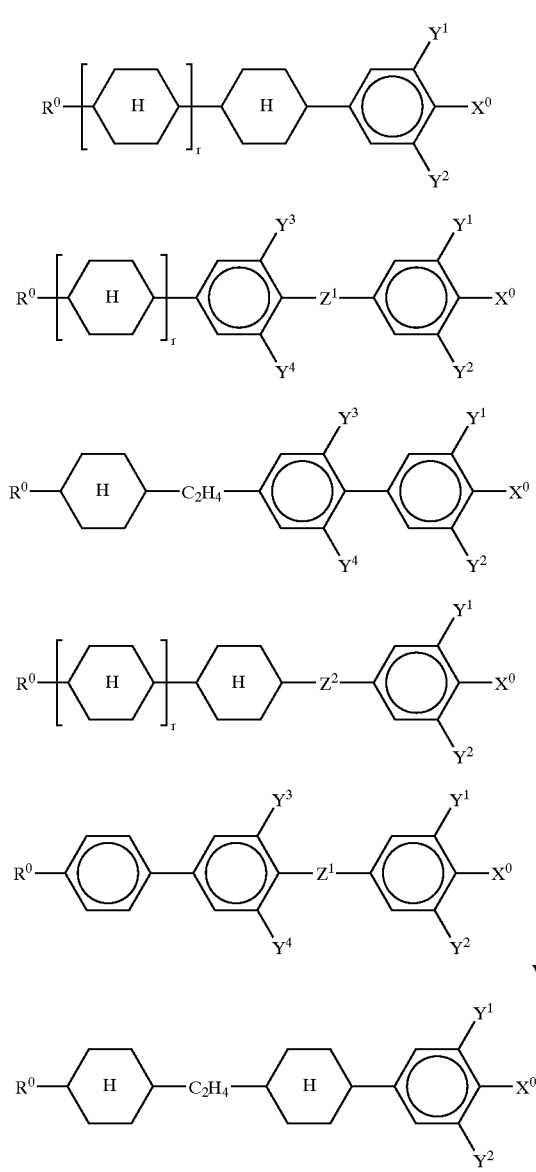

wherein

R⁰ is alkyl, alkoxy, fluoroalkyl, alkenyl or oxaalkenyl with 1 to 9 C atoms, $Z^1$ is $CF_2O$, $C_2F_4$ or a single bond, $Z^2$ is $CF_2O$, $C_2F_4$ or $C_2H_4$, $X^0$ is is F, Cl, $CF_3$, $OCF_3$, $OCHF_2$, fluoroalkyl or fluoroalkoxy with up to 7 carbon atoms, $Y^1$ to $Y^4$ are independently of each other H or F, and r is 0 or 1, provided that the medium contains at least one compound of formula VII wherein $X^0$ is F.

31. A medium according to claim 30, which additionally comprises one or more compounds of the formula II

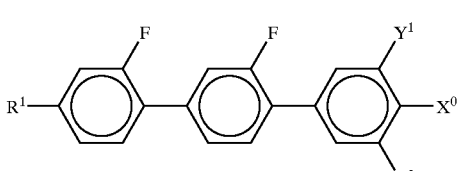

wherein $R^1$ has the meaning given under formula I, $X^0$ is F, Cl, $CF_3$, $OCF_3$, $OCHF_2$, fluoroalkyl or fluoroalkoxy with up to 7 carbon atoms, and $Y^1$ and $Y^2$ are each independently of one another H or F.

32. A medium according to claim 30, which additionally comprises one or more compounds selected from the formulae IX to XVI:

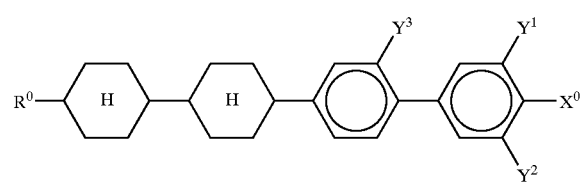

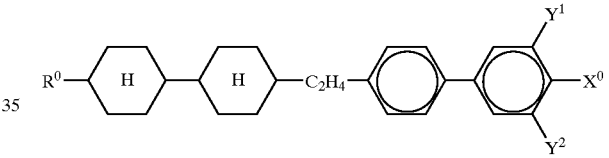

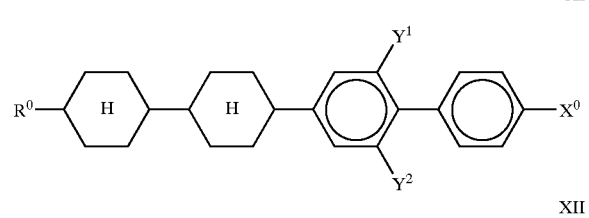

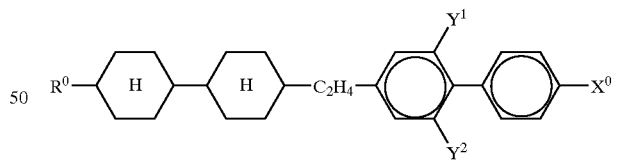

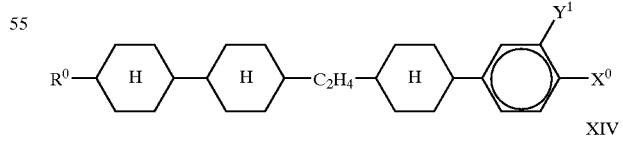

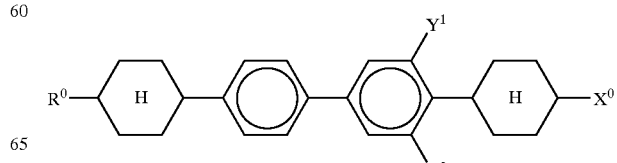

-continued

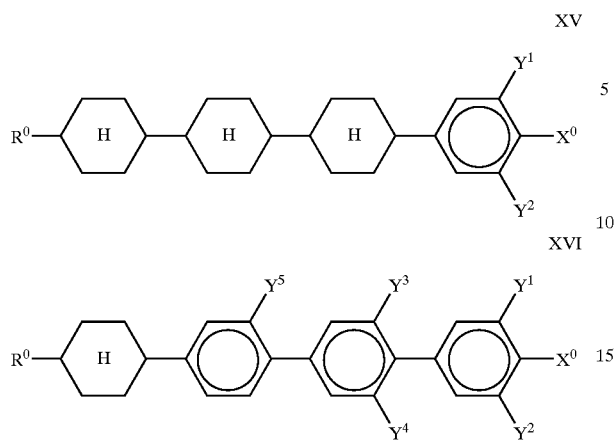

wherein

R⁰ is alkyl, alkoxy, fluoroalkyl, alkenyl or oxaalkenyl with 1 to 9 atoms,

X⁰ is F, Cl, CF₃, OCF₃, OCHF₂, fluoroalkyl or fluoroalkoxy with up to 7 carbon atoms, and Y¹ to Y⁵ are independently of each other H or F.

33. A medium according to claim 31, which additionally comprises one or more compounds selected from the formulae IX to XVI:

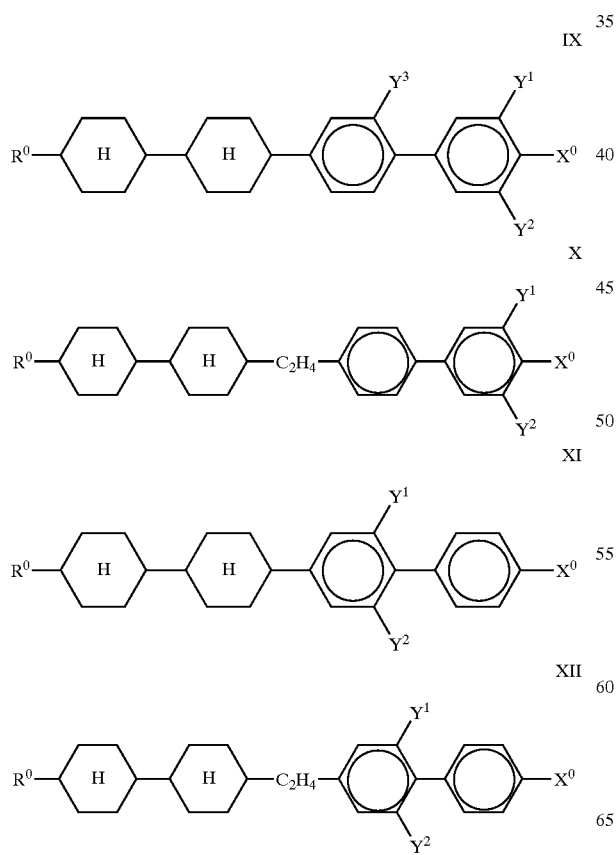

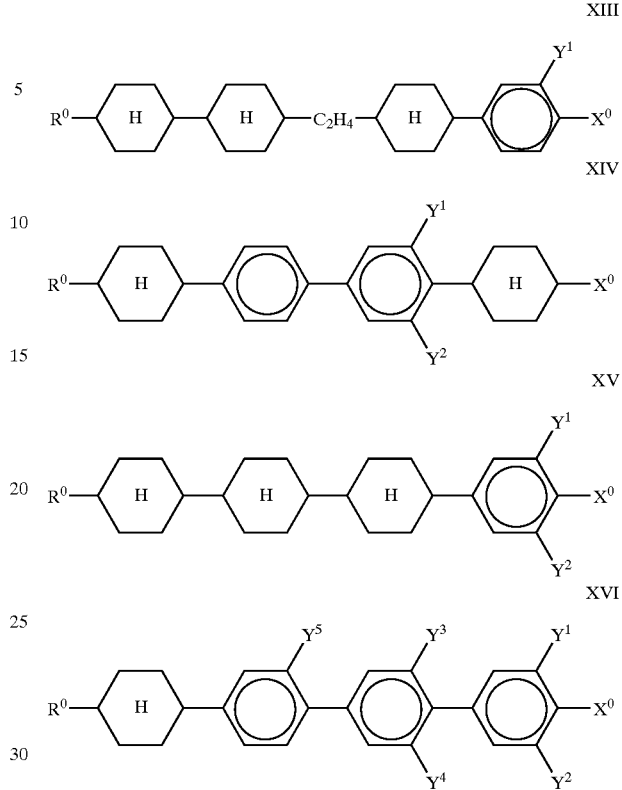

wherein
R⁰ is alkyl, alkoxy, fluoroalkyl, alkenyl or oxaalkenyl wit 1 to 9 atoms,
X⁰ is F, Cl, CF₃, OCF₃, OCHF₂, fluoroalkyl or fluoroalkoxy with up to 7 carbon atoms, and
Y¹ to Y⁵ are independently of each other H or F.

34. A medium according to claim 30, which additionally comprises one or more compounds selected from the formulae XVII to XIX:

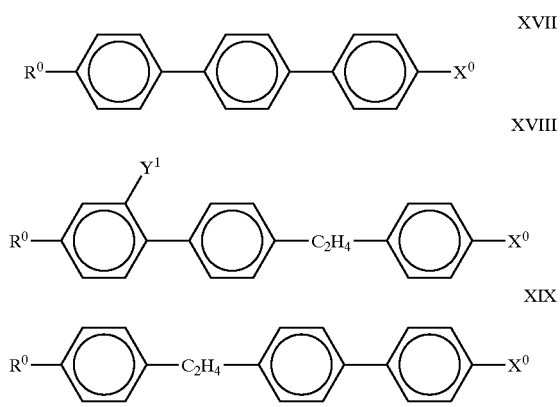

wherein R⁰ is alkyl, alkoxy, fluoroalkyl, alkenyl or alkenyl or oxaalkenyl with 1 to 9 C atoms,
X⁰ is F, Cl, CF₃, OCF₃, OCHF₃, fluoroalkyl or fluoroalkoxy with up to 7 carbon atoms, and
Y¹ is H or F.

35. A medium according to claim 30, which additionally comprises one or more compounds selected from the formulae XX to XXIII:

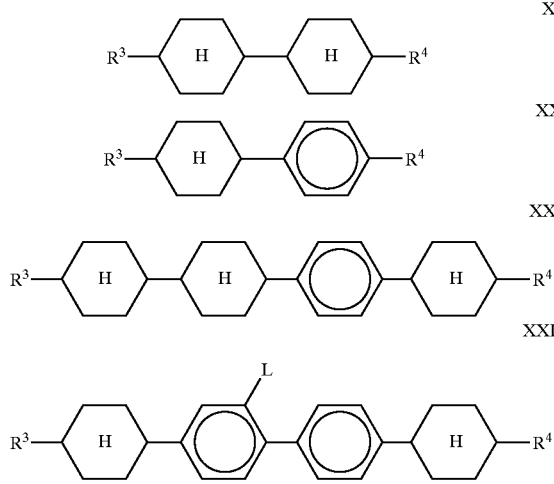

wherein $R^3$ and $R^4$ have independently of each other one of the meanings of $R^1$ in formula I and L is H or F.

36. A medium according to claim 30, which comprises one or more compounds of formula Ia

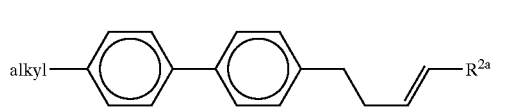

wherein alkyl is an alkyl group with 1 to 8 C atoms and $R^{2a}$ is H or methyl.

37. A medium according to claim 30, which comprises 20 to 75% by weight of one or more compounds selected from formulae IVa, IVb and IVc

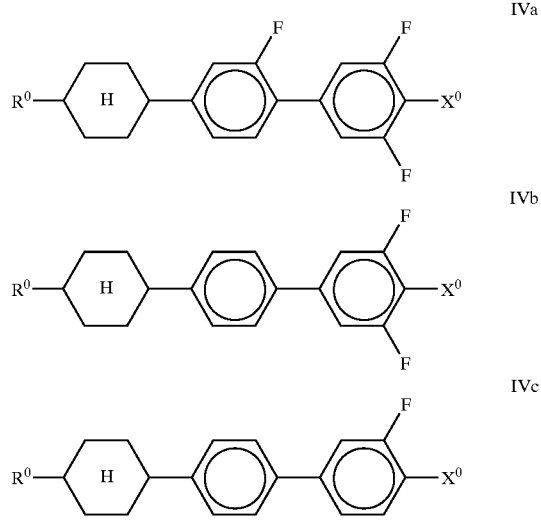

wherein $R^0$ and $X^0$ have the meaning given above.

38. A medium according to claim 30, which comprises 5 to 15% by weight of one or more compounds of the formula I.

39. A medium according to claim 31, which comprises 10 to 45% by weight of one or more compounds of formula II.

40. A liquid crystal display comprising a liquid crystal mixture according to claim 30.

41. An electrooptical liquid-crystal display of LCOS or OCB mode containing a liquid-crystal mixture according to claim 30.

42. A medium of claim 31, which comprises a compound of the formula II wherein $X^0$ is Cl and $Y^1$ and $Y^2$ are H.

43. A liquid-crystalline medium based on a mixture of polar compounds of positive dielectric anisotropy, which comprises:

one or more compounds of formula I

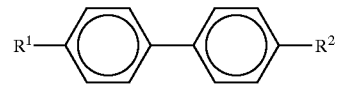

wherein $R^1$ is alkyl or alkoxy with 1 to 15 C atoms, and $R^2$ is alkenyl with 5 to 7 C atoms, and, which additionally comprises one or more compounds of the formula II

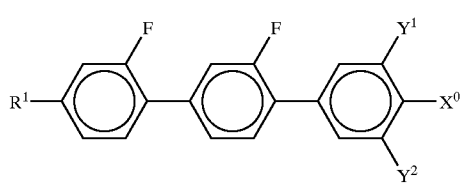

wherein $R^1$ has the meaning given under formula I, $X^0$ is F, Cl, $CF_3$, $OCF_3$, $OCHF_2$, fluoroalkyl or fluoroalkoxy with up to 7 carbon atoms, and $Y^1$ and $Y^2$ are each independently of one another H or F.

44. A liquid-crystalline medium based on a mixture of polar compounds of positive dielectric anisotropy, which comprises:

one or more compounds of formula I

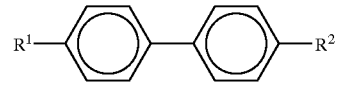

wherein $R^1$ is alkyl or alkoxy with 1 to 15 C atoms, and $R^2$ is alkenyl with 5 to 7 C atoms, and which additionally comprises one or more compounds selected from the formulae III to VIII:

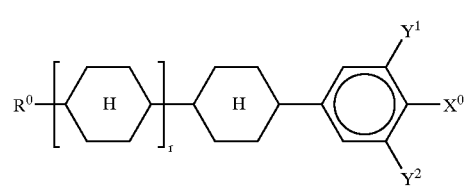

-continued

IV
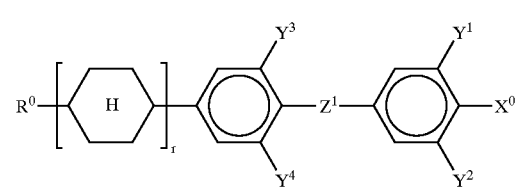

V
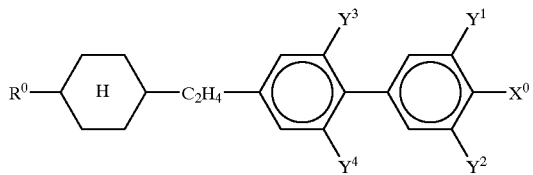

VI
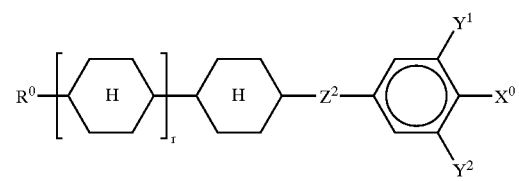

VII
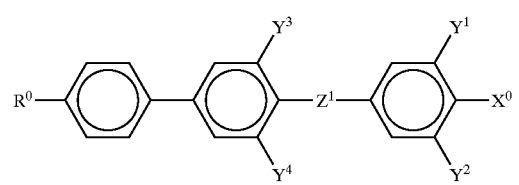

VIII
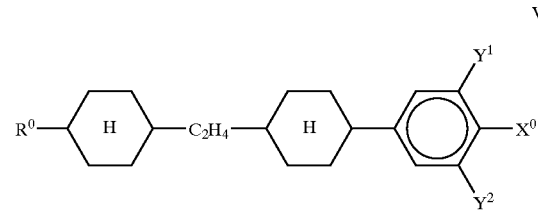

wherein
- $R^0$ is alkyl, alkoxy, fluoroalkyl, alkenyl or oxaalkenyl with 1 to 9 C atoms,
- $Z^1$ is $CF_2O$, $C_2F_4$ or a single bond,
- $Z^2$ is $CF_2O$, $C_2F_4$ or
- $X^0$ is F, Cl, $CF_3$, $OCF_3$, $OCHF_2$, fluoroalkyl or fluoroalkoxy with up to 7 carbon atoms,
- $Y^1$ to $Y^4$ are independently of each other H or F, and
- r is 0 or 1.

45. A liquid-crystalline medium based on a mixture of polar compounds of positive dielectric anisotropy, which comprises:

one or more compounds of formula I

I
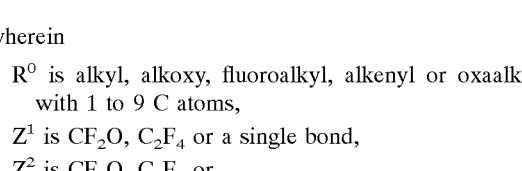

wherein
- $R^1$ is alkyl or alkoxy with 1 to 15 C atoms, and
- $R^2$ is alkenyl with 5 to 7 C atoms, and, which additionally comprises one or more compounds selected from the formulae IX to XVI:

IX
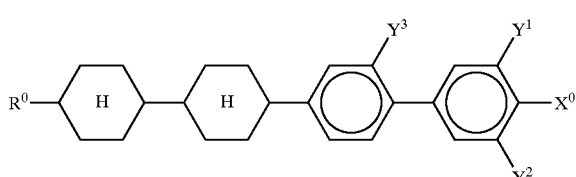

X
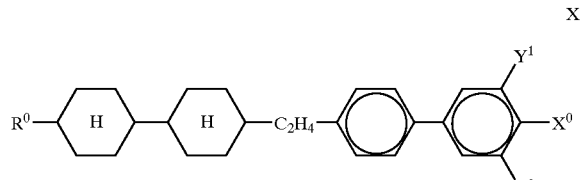

XI
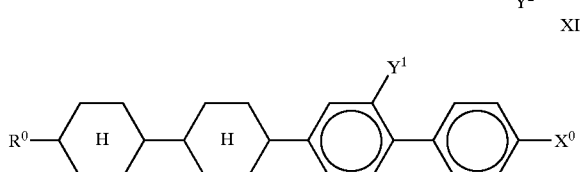

XII
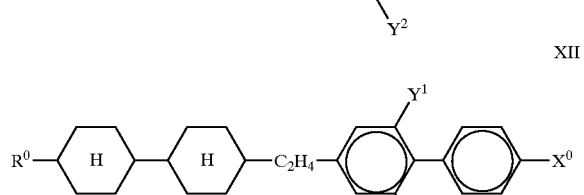

XIII
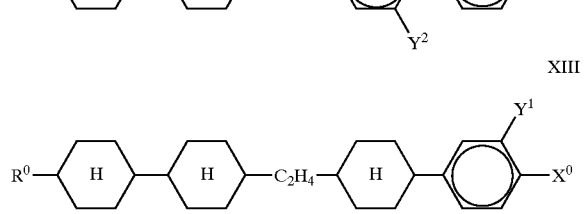

XIV
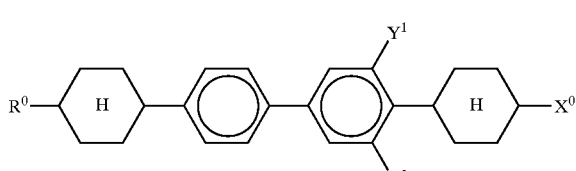

XV
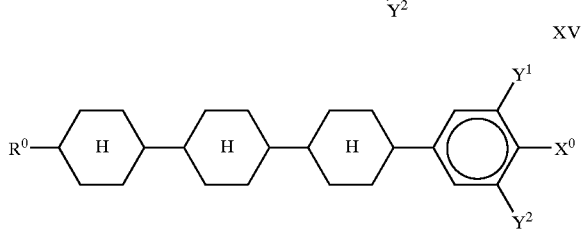

XVI
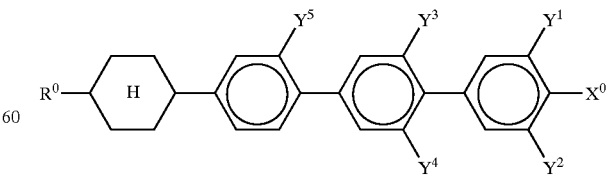

wherein
- $R^0$ is alkyl, alkoxy, fluoroalkyl, alkenyl or oxaalkenyl with 1 to 9 atoms, $X^0$ is F, Cl, $CF_3$, $OCF_3$, $OCHF_2$, fluoroalkyl or fluoroalkoxy with up to 7 carbon atoms, and $Y^1$ to $Y^5$ are independently of each other H or F.

46. A medium according to claim 44, which additionally comprises one or more compounds selected from the formulae IX to XVI:

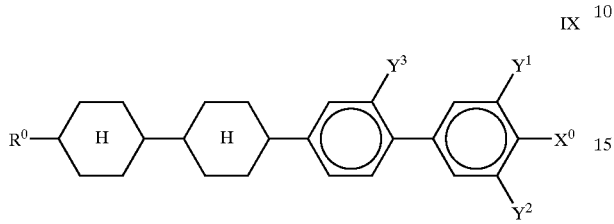
IX

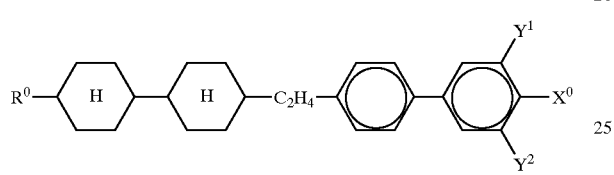
X

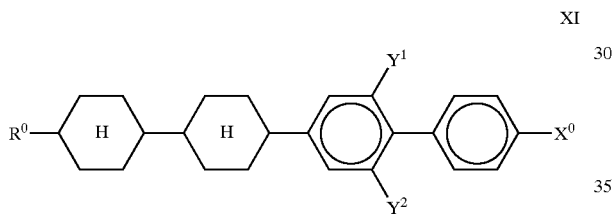
XI

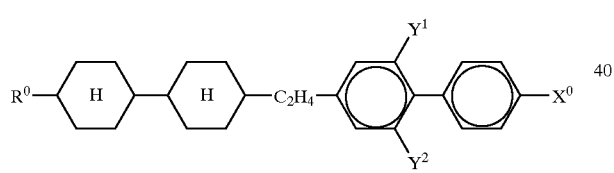
XII

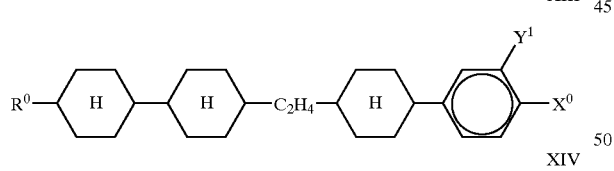
XIII

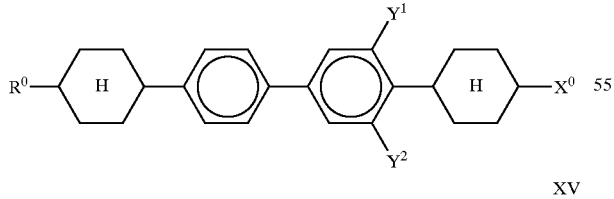
XIV

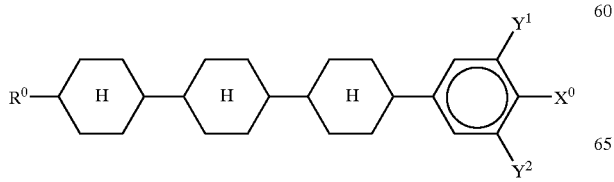
XV

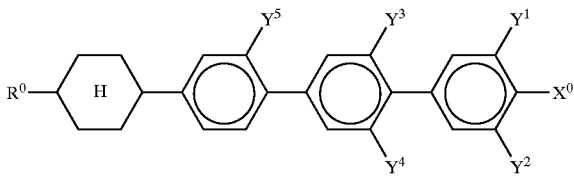
XVI wherein $R^0$ is alkyl, alkoxy, fluoroalkyl, alkenyl or oxaalkenyl with 1 to 9 atoms, $X^0$ is F, Cl, CF3, $OCF_3$, $OCHF_2$, fluoroalkyl or fluoroalkoxy with up to 7 carbon atoms, and $Y^1$ to $Y^5$ are independently of each other H or F.

47. A liquid-crystalline medium based on a mixture of polar compounds of positive dielectric anisotropy, which comprises:

one or more compounds of formula I

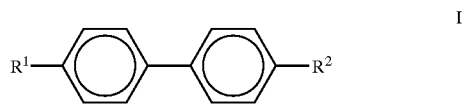
I wherein $R^1$ is alkyl or alkoxy with 1 to 15 C atoms, and $R^2$ is alkenyl with 5 to 7 C atoms, and, which additionally comprises one or more compounds selected from the formulae XVII to XIX:

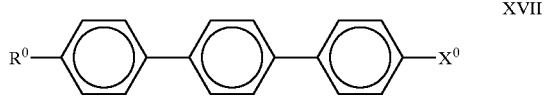
XVII

XVIII

XIX wherein $R^0$ is alkyl, alkoxy, fluoroalkyl, alkenyl or alkenyl or oxaalkenyl with 1 to 9 C atoms, $X^0$ is F, Cl, $CF_3$, $OCF_3$, $OCHF_3$, fluoroalkyl or fluoroalkoxy with up to 7 carbon atoms, and $Y^1$ is H or F.

48. A liquid-crystalline medium based on a mixture of polar compounds of positive dielectric anisotropy, which comprises:

one or more compounds of formula I

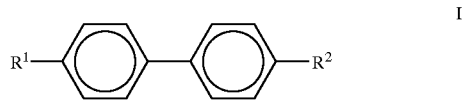
I wherein
R¹ is alkyl or alkoxy with 1 to 15 C atoms, and
R² is alkenyl with 5 to 7 C atoms, and,
which additionally comprises one or more compounds selected from the formulae XX to XXIII:

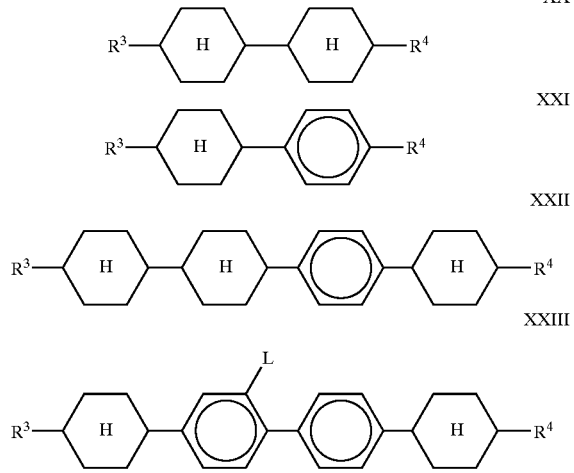

wherein R³ and R⁴ have independently of each other one of the meanings of R¹ in formula I and L is H or F.

49. A medium according to claim 44, which comprises 20 to 75% by weight of one or more compounds selected from formulae IVa, IVb and IVc

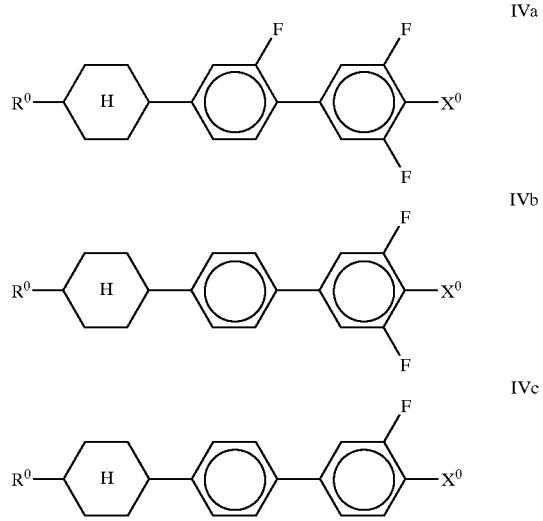

wherein R⁰ and X⁰ have the meaning given above.

50. A medium according to claim 43, which comprises 10 to 45% by weight of one or more compounds of formula II.

51. An electrooptical liquid-crystal display of LCOS or OCB mode containing a liquid-crystal mixture based on a mixture of polar compounds of positive dielectric anisotropy, which mixture comprises:

one or more compounds of formula I

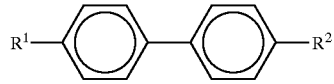

wherein
R¹ is alkyl or alkoxy with 1 to 15 C atoms, and
R² is alkenyl with 5 to 7 C atoms.

52. A medium of claim 43, which comprise a compound of the formula II wherein X⁰ is Cl and Y¹ and Y² are H.

53. A medium of claim 44, which comprise at least one compound of the formula VII wherein X⁰ is F.

54. A liquid-crystalline medium based on a mixture of polar compounds of positive dielectric anisotropy, which comprises:

one or more compounds of formula I

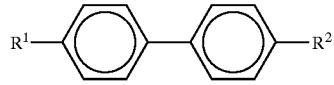

wherein
R¹ is alkyl or alkoxy with 1 to 15 C atoms, and
R² is alkenyl with 5 to 7 C atoms,
provided that the medium comprises at least one compound of the formula I wherein R² is-CH₂CH₂CH=CH-R²ᵃ wherein R²ᵃ is methyl, ethyl or n-propyl.

55. An electrooptical liquid-crystal display of LCOS or OCB mode containing a liquid-crystal mixture according to claim 43.

56. An electrooptical liquid-crystal display of LCOS or OCB mode containing a liquid-crystal mixture according to claim 44.

57. An electrooptical liquid-crystal display of LCOS or OCB mode containing a liquid-crystal mixture according to claim 45.

58. An electrooptical liquid-crystal display of LCOS or OCB mode containing a liquid-crystal mixture according to claim 47.

59. An electrooptical liquid-crystal display of LCOS or OCB mode containing a liquid-crystal mixture according to claim 48.

60. An electrooptical liquid-crystal display of LCOS or OCB mode containing a liquid-crystal mixture according to claim 54.

* * * * *

UNITED STATES PATENT AND TRADEMARK OFFICE
CERTIFICATE OF CORRECTION

PATENT NO. : 6,827,989 B2
DATED : December 7, 2004
INVENTOR(S) : Atsutaka Manabe It is certified that error appears in the above-identified patent and that said Letters Patent is hereby corrected as shown below:

Column 20,
Line 12, reads "comprise" should read -- comprises --

Column 22,
Line 46, reads "and to are" should read -- and $y^1$ to $y^5$ are--

Column 34,
Line 34, reads "wit" should read -- with --

Column 42,
Line 17, reads "comprise" should read -- comprises --

Signed and Sealed this

Twenty-sixth Day of April, 2005

JON W. DUDAS
*Director of the United States Patent and Trademark Office*